(12) United States Patent
Miyazaki et al.

(10) Patent No.: US 6,715,923 B2
(45) Date of Patent: Apr. 6, 2004

(54) DOUBLE ROW BEARING DEVICE

(75) Inventors: Seizo Miyazaki, Fujisawa (JP); Hideo Ouchi, Fujisawa (JP); Toru Takamizawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 8 days.

(21) Appl. No.: 09/754,334

(22) Filed: Jan. 5, 2001

(65) Prior Publication Data

US 2001/0038727 A1 Nov. 8, 2001

(30) Foreign Application Priority Data

| Jan. 6, 2000 | (JP) | ........................ | 2000-000990 |
| Jan. 6, 2000 | (JP) | ........................ | 2000-000989 |
| Jul. 17, 2000 | (JP) | ........................ | 2000-216236 |
| Jul. 26, 2000 | (JP) | ........................ | 2000-225152 |
| Dec. 13, 2000 | (JP) | ........................ | 2000-378469 |

(51) Int. Cl.$^7$ ............................................... F16C 33/60
(52) U.S. Cl. ........................................ 384/500; 384/501
(58) Field of Search ................. 384/499, 500, 384/501, 502, 504, 517

(56) References Cited

U.S. PATENT DOCUMENTS

| 1,259,222 | A | * | 3/1918 | Forseberg | .................... 384/504 |
| 1,467,378 | A | * | 9/1923 | Hanson | ....................... 384/504 |
| 3,900,232 | A | * | 8/1975 | Rode | ............................ 384/517 |
| 4,854,750 | A | * | 8/1989 | Lavin | .......................... 384/500 |
| 5,066,145 | A | * | 11/1991 | Sibley et al. | ................. 384/463 |
| 5,620,263 | A | * | 4/1997 | Ohtsuki et al. | .............. 384/517 |
| 6,010,247 | A | * | 1/2000 | Mouri et al. | ................. 384/517 |
| 6,367,980 | B1 | * | 4/2002 | Kobayashi | ................... 384/517 |
| 6,371,654 | B1 | * | 4/2002 | Misso | ......................... 384/499 |

FOREIGN PATENT DOCUMENTS

| JP | 58-160621 | * | 9/1983 | ........... F16C/19/54 |
| JP | 10-318255 | * | 12/1998 | ........... F16C/25/08 |
| JP | 10318255 A | * | 12/1998 | ........... F16C/25/08 |

* cited by examiner

Primary Examiner—David A. Bucci
Assistant Examiner—Timothy McAnulty
(74) Attorney, Agent, or Firm—Crowell & Moring LLP

(57) ABSTRACT

A bearing device comprising a shaft, a housing, a double row of bearings provided between the shaft and the housing and preloaded by a fixed-position preloading method, the double row of bearings having a pair of races with a gap therebetween for preload adjustment, and the bearing device further having a support member for supporting one side of the races in the pre-loading direction, and the support member provided on the side of one of the shaft and the housing.

3 Claims, 19 Drawing Sheets

DOUBLE ROW BEARING DEVICE

BACKGROUND OF THE INVENTION

1. Field of the Invention

This invention relates to a bearing device having a double-row bearing, and particularly to a small bearing device that is used in the spindle motor, swing arm, IC cooling fan motor or the like for an information storage device such as a hard-disk drive, floppy-disk drive, or optical-disk drive.

2. Description of the Related Art

Conventionally, two ball bearings, that are spaced by a spacer, have been used as the bearing device for a hard-disk drive. Moreover, in Japanese Patent Publication No. Toku kai hei 10-227310, a bearing device with the object of reducing the outer diameter of the bearing while maintaining sufficient strength and shaft rigidity has been proposed. This publication is incorporated in this specification by reference.

In this kind of bearing device, the shaft is formed with two sections; a large diameter section and a small diameter section, and by forming an inner-ring raceway in the outer peripheral surface of the large diameter shaft section, the shaft is also used as one inner ring. In addition, the other inner ring is attached to the small-diameter shaft section.

Recently, as the motor of hard-disk drives has become smaller, it is necessary that the width of the bearing (dimension in the axial direction) be made smaller, for example, 2 mm or less. It has been thought that as a method for greatly reducing the width of the bearing, a single-row bearing could be used, however, when using a single-row bearing, vibration or run-out of the rotating shaft increases and it is not desirable.

A bearing unit that is capable of reducing the width of the bearing while at the same time suppressing vibration or run-out of the rotating shaft has been disclosed in Japanese Patent Publication No. Toku Kai Hei 6-222733, for example. This publication is incorporated in this specification by reference.

This bearing comprises two rows of balls, an inner ring, middle ring and outer ring, where the inner peripheral surface of the middle ring is the outer ring of one row of balls, and the outer peripheral surface of the middle ring becomes the inner ring of the other row of balls. In other words, the diameter of the pitch circle of the balls provided between the middle ring and the outer ring is larger than the diameter of the pitch circle of the balls provided between the inner ring and the middle ring. Moreover, the distance in the axial direction of the two rows of balls, specifically the distance between the centers of the balls is about the diameter of the balls.

Also, in the case where the double-row ball bearing is set between the shaft and the housing such that it is pre-loaded by a fixed-position pre-loading method, this pre-loading is performed by locating the two inner rings with the gap for adjusting the pre-load, and by pressing the sides of the two outer rings such that they are elastically deformed.

However, in the bearing of the aforementioned disclosure, the method of reducing the width of the bearing should be improved. In addition, in the bearing of the aforementioned disclosure, in order to apply a pre-load to the bearing, a complicated procedure is required when placing the bearing between the shaft and housing.

In a bearing with a small width (dimension in the axial direction) of 2 mm or less, for example, when two inner rings and outer rings with the same width are formed as in the prior double-row bearing, and the bearing is formed with a constant width in the radial direction, the bond margin is not sufficient, and there is the possibility that sufficient bond strength between the shaft and the housing cannot be obtained.

The double-row bearing is set between the shaft and the housing such that it is pre-loaded by a fixed-position pre-loading method, however, when it is not possible to obtain sufficiently strong bond strength, as described above, there is the possibility that the position of the two inner rings (races located with a gap for adjusting the pre-load) will not be fixed, and thus cause the space for adjusting the pre-load, as well as the pre-load, to change.

For example, the HDD used for a computer memory device comprises a housing fixed to a frame etc. and a support shaft fixed to the housing, and a bearing device for rotatably supporting a hub or inner member.

A single annular hard disc (or discs) has an inner peripheral portion supported by the hub or inner member to rotate together with the hub or inner member.

Since the hard disc has a thin track for recording data, the hub or inner member must be rotatably supported by the support shaft preventing vibration or NRRO (non-repetitive run out). Therefore, conventionally, as the bearing device provided e.g. between the outer peripheral surface of the support shaft and the inner peripheral surface of the hub, the structure where a pair of ball bearings are combined with each other, such that a preload is applied to the balls in the bearings so as to sufficiently secure the bearing rigidity.

JP Patent Publication Toku Kai Hei 10-159843 discloses such a bearing device. This publication is incorporated in this specification by reference.

In this structure, the support shaft has a base portion fixed to the center portion of the housing, and the bearing device has a pair of ball bearings are provided between the tip end and intermediate portion of the support shaft and the radially inner cylindrical portion within the hub. The inner races of the bearings are fixed through interference fit or adhesion to the tip end and intermediate portion of the shaft. The outer races are formed with cylindrical projections provided at an axial end and axially projecting than the end surfaces of the inner races. The tip ends of the projections are abutted to each other, and only the abutment portions of the outer races are fitted into the radially inner cylindrical portion of the hub. There are lands circumferentially provided on the radially inner side of the axially intermediate portion of the radially inner cylindrical portion.

In this bearing device, a desired preload is applied to the balls by pushing the inner races to come closer to each other with a gap provided between the axial end surfaces thereof. And, the hub is rotatably supported around the support shaft with no play under the preload.

Incidentally, when the bearing device under preload is incorporated in a narrow space, generally the bearing device is preloaded through the fixed position preloading method. There are two ways for mounting the bearing device preloaded through the fixed position preloading method to the support shaft.

1. a pair of inner races are fitted onto and fixed to the support shaft through interference fit applying a load to have the inner races come closer to each other.
2. a pair of inner races are fitted onto the support shaft through clearance fit, and bonded for fixing under a load to have the inner races to come closer to each other.

The installation of the bearing device to the shaft in either way above can be carried out only by the bearing manufacturer who has a special apparatus to highly precisely apply a desired preload to the bearing device.

SUMMARY OF THE INVENTION

Taking the problems with the prior art into consideration, the object of this invention is to provide a double-row bearing that is set between the shaft and the housing such that it is pre-loaded by a fixed-position pre-loading method, and that will make it possible to greatly reduce the width of the bearing to 2 mm or less while at the same time suppress vibration of the rotating shaft, as well as reduce the number of components and make it possible to perform pre-loading more easily when setting the bearing between the shaft and the housing.

Moreover, another object of the invention is to provide a bearing device having a shaft, a housing and a double-row bearing that is set between the shaft and housing such that it is pre-loaded by a fixed-position pre-loading method, and that prevents movement of the two races, that are located with the gap for adjusting the pre-load, such that no change occurs in the gap for adjusting the pre-load, even when the width (dimension in the axial direction) of the double-row bearing is extremely small or less than 2 mm.

Another object of the present invention is to provide a small lightweight bearing device having sufficient rigidity under preload, through reduced manufacturing steps for cost reduction, and for a long durability of performance.

DETAILED DESCRIPTION OF THE PREFERRED EMBODIMENTS

Figure 1:
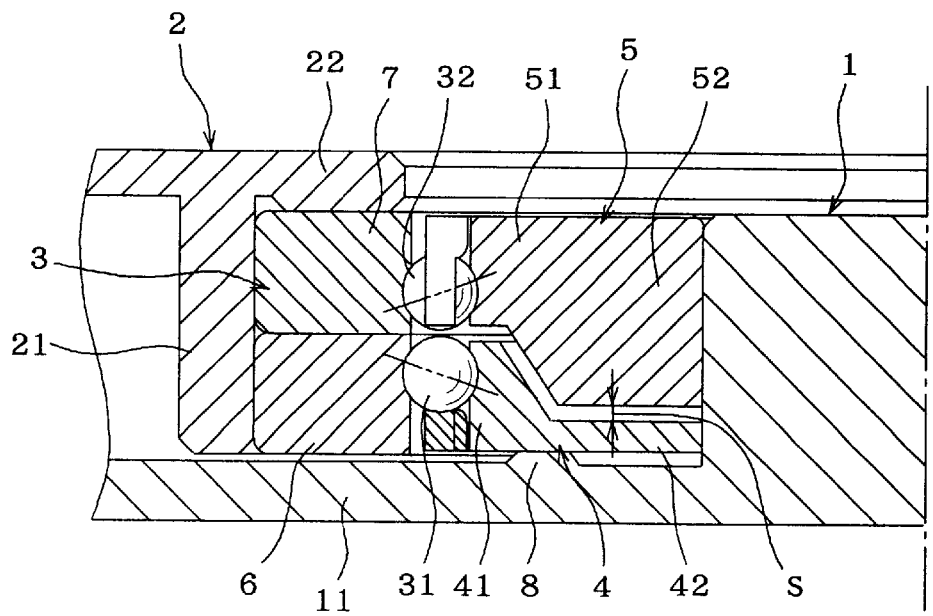
FIG. 1 is a cross sectional view of part of a bearing device according to a first example of the embodiment of the present invention.

The bearing device in one feature of this invention comprises: a shaft, a housing, and a double-row bearing set between the shaft and housing such that it is pre-loaded by a fixed-position pre-loading method, and where on the shaft side or housing side, there is a support member that supports, in the pre-loading direction, one side of the two races located with the gap for adjusting the pre-load. Of the two races that are located with the pre-load adjustment space, the race that is supported on one side in the pre-load direction by the aforementioned support member is called "the first race", and the other race is called "the second race". The term "ring" can also be used in place of "race" in the present specification.

With the bearing device of this invention, the position of the first race is fixed in the pre-load direction by the support member, so it is possible to reduce the width (dimension in the axial direction) of this first race, and to increase the width of the second race. Also, by fastening with adhesion this second race to the shaft or to the housing in a fitting relation, it is possible to obtain sufficient bonding strength even when the width (dimension in the axial direction) of the double-row bearing is very small, that is 2 mm or less. The first race may be or not be fastened with adhesion to the shaft or housing in a fitting relation.

In this way, in the bearing device of this invention, of the two races that are located with the pre-load adjustment gap, it is desirable that the width of the first race, that is supported in the pre-load direction by the aforementioned support member, be less than the width of the other race, or second race, and that at least the second race be fastened with adhesion to the shaft or to the housing in a fitting relation.

In this case, the first race is supported by the support member even when an external load is applied to the bearing device, and the second race is secured by a wide bonding surface, so there is no movement of these races.

In a preferred embodiment of this invention, the races that are located with the pre-load adjustment gap are the inner rings, and there is a ring-shaped member located in the space between the inner peripheral surface of the inner ring (first inner ring), that is supported in the pre-load direction by the aforementioned support member, and the shaft. In addition, the dimension in the axial direction (length) of this ring-shaped member is larger than the dimension in the axial direction (width) of the inner ring (first inner ring), and this ring-shaped member and the support member are formed as one member, and together with fastening with adhesion this ring-shaped member to the shaft. Further, there is a flange that protrudes out in the radial direction to the outside of this ring-shaped member such that the other inner ring (second inner ring) fits with this flange.

With this bearing device, the length of the ring-shaped member is greater than the width of the inner ring, that is supported by the support member, this ring-shaped member is fastened with adhesion to the shaft, and the other inner ring fits with the flange. Therefore, it is possible to obtain sufficient bonding strength even when the width (direction in the axial direction) of the double-row bearing is very small, that is 2 mm or less.

Moreover, a raceway is formed on the outer peripheral surface of this flange, and by making the radially inner section of this flange the second inner ring, the second inner ring is integrated with shaft, and the position of the second ring is securely fixed in relation to the shaft, so it is possible to obtain even more stability when an external load is applied to the bearing device.

In another embodiment of the invention, the races that are located with the pre-load adjustment gap are the inner rings, and the width of the radially inner section of the inner ring (first inner ring) that is supported on its side in the pre-load direction by the aforementioned support member, is greater than the width of the radially outer section thereof, and the width of the radially inner section of the other ring (second inner ring) is less than the width of the radially outer section thereof, such that the outer diameter of the radially inner section of the first inner ring is equal to the inner diameter of the radially inner section of the second inner ring, and where the outer peripheral surface of the radially inner section of the first inner ring and the inner peripheral surface of the radially inner section of the second inner ring fit together, and where there is a member located between the shaft and the double-row bearing comprising a ring member that is located between the inner peripheral surface of the radially inner section of the first ring and the shaft, and a flange that protrudes outward from one end in the lengthwise direction of this ring member, and where this ring member is fastened to the inner peripheral surface of the radially inner section of the first ring, and the flange fits with the radially inner section of the second inner ring.

With this bearing device, the radially inner section of the first ring is fastened with adhesion to the ring member over a wide bonding surface, and the radially inner section of the second inner ring fits with the radially inner section of the first inner ring as well as engages with the flange. Therefore, it is possible to obtain sufficient bonding strength even when the width (dimension in the axial direction) of the double-row bearing is very small, that is 2 mm or less.

The double-row ball bearing of this invention, which is set between the shaft and the housing such that it is pre-loaded by a fixed-position pre-loading method, has the following four features:

(1) The two rows of balls are located at positions such that they are separated from each other in the radial direction of the bearing.

(2) The first inner ring is formed such that the width of the radially inner section on the shaft side is less than the width of the radially inner section having the raceway.

(3) The second inner ring is formed such that the width of the radially inner section on the housing side is less than the width of the radially inner section having the raceway.

(4) The radially inner section of the first inner ring is located further outside in the radial direction than the radially inner section of the second inner ring.

With the double-row ball bearing of this invention, it is possible to suppress vibration or run-out of the rotating shaft even when the width of the bearing is greatly reduced.

In the double-row ball bearing of this invention, it is desirable that the two rows of balls are such that the distance in the axial direction, specifically the distance between the centers of the balls in respective rows is less than the diameter of the balls, and that the difference between the diameter of the pitch circle of the balls in one row and the diameter of the pitch circle of the balls in the other row is two times or greater than the diameter of the balls.

It is desirable that the double-row ball bearing of this invention have a retaining member for maintaining a pre-load adjustment gap. By doing so, it is possible to adjust the pre-load before installing the double-row ball bearing between the shaft and the housing.

Moreover, by press-fitting two races with a pre-load adjustment gap, such that they can move with respect to the gap retaining member, it is possible to adjust the pre-load after the bearing has been installed.

A ring member that is located between the two races with the pre-load adjustment gap, and the shaft or housing, is used as this gap retaining member.

It is also possible for the second inner ring to function as the gap retaining member by forming the width of the second inner ring such that it is greater than the width of first inner ring, and fitting the radially inner section of the first inner ring in the radially outer section of the second inner ring.

With the races that are deformed elastically by pressing on the sides of each race in order to pre-load the bearing, it is possible to have separate races for each row of balls or it is possible to form the races in a single member where the raceways are provided for both rows of balls.

FIG. 1 is a cross-sectional drawing showing the bearing device of a first example of the invention.

This bearing device comprises a shaft 1, a housing 2 and a double-row ball bearing 3. The double-row ball bearing 3 is set between the shaft 1 and the housing 2, such that it is pre-loaded by a fixed-position pre-loading method. In this bearing device, the double-row ball bearing 3 has two, first and second inner rings 4, 5 which are provided with a gap S for adjusting the pre-load, and two, first and second outer rings 6, 7 which are located such that they are pressed directly.

On one end in the lengthwise direction of the shaft 1, there is a circular disk-shaped member 11 that is integrated with the shaft 1. On the surface, on the shaft 1 side of this circular disk-shaped member 11, there is a support member 8 that supports the outer surface of the first inner ring 4 (surface on the opposite side of the pre-load adjustment gap S) in the pre-load direction. The housing 2 comprises an outer peripheral member 21 that supports the outer peripheral surface of the two outer rings 6, 7, and a side surface member 22 that supports the outside (axially outer) surface of the second outer ring 7 which is located on the outside (axially outer side) of the second inner ring 5.

The widths of the two outer rings 6, 7 of the double-row ball bearing 3 are the same as each other, and uniform throughout in the radial direction. The balls 31, 32 in the two rows of the double-row ball bearing 3 have the same ball diameter and are arranged in the same radial direction.

The widths (dimension in the axial direction) of the radially outer sections, having the raceways, f the two inner rings 4, 5 of the double-row ball bearing 3 are the same as each other, however the widths of the radially inner sections (on the shaft 1 side) are different. For the first inner ring 4, the width of the radially inner section 42 is narrower than the radially outer section 41. For the second inner ring 5, the width of the radially inner section 52 is broader than the radially outer section 51. Therefore, the width of the radially inner section 52 of the second inner ring 5 is wider than the width of the radially inner section 42 of the first inner ring 4. The radially inner section 52 of the second inner ring 5 protrudes outward in the axial direction (downward in FIG. 1) from the second outer ring 7, and enters inside the first outer ring 6.

The inner peripheral surface of the radially inner section 52 of the second inner ring 5 is bonded to the shaft 1. The inner peripheral surface of the radially inner section 42 of the first inner ring 4 is not bonded to the shaft 1. The outside surface of the first inner ring 4 is supported by the support member 8. The two outer rings 6, 7 fit at a fixed gap with the outer peripheral member 21 of the housing 2. Moreover, the outside surface of the second outer ring 7 is pressed onto the side-surface member 22 of the housing 2.

As described above, with the bearing device, the position of the first inner ring 4 is fixed by the support member 8, the width of radially inner section 42 of the first inner ring 4 is much less than the width of the radially inner section 52 of the second inner ring 5, and the wide radially inner section 52 of the second inner ring 5 is fastened to the shaft 1 with adhesion. Accordingly, with this bearing device, there is no movement of the first inner ring 4 even when the width of the double-row ball bearing 3 is very small, that is 2 mm or less, so it is possible to obtain sufficient bonding strength with second inner ring 5.

The inner peripheral surface of the radially inner section 42 of the first inner ring 4 may be fastened to the radially outer surface of the shaft 1 with adhesion.

Figure 2:
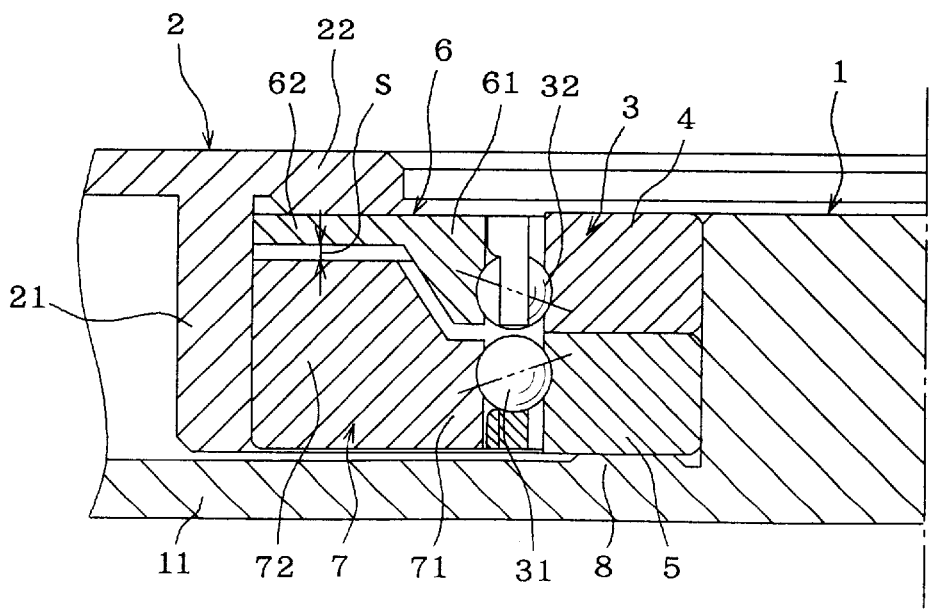
FIG. 2 is a cross sectional view of part of a bearing device according to a second example of the embodiment of the present invention.

FIG. 2 is a cross-sectional drawing showing the bearing device of a second example of this invention.

This bearing device comprises a shaft 1, a housing 2 and double-row ball bearing 3. The double-row ball bearing 3 is set between the shaft 1 and the housing 2 such that it is pre-loaded by a fixed-position pre-loading method. In this bearing device, the double-row ball bearing 3 has two, first and second outer rings 6, 7 which are arranged with a gap S for adjusting the pre-load, and two, first and second inner rings 4, 5 which are located such that they are pressed directly to each other.

On one end of the shaft 1 in the lengthwise direction, there is a circular disk-shaped member 11 that is integrated with the shaft 1. On the surface on the shaft 1 side of this circular disk-shaped member 11, there is a support member 8 for supporting the side surface of the second inner ring 5. The housing 2 comprises an outer peripheral member 21 for supporting the outer peripheral surface of the two outer rings 6, 7, and a side-surface member 23 for supporting the outside surface of the first outer ring 7.

Both of the two inner rings 4, 5 of the double-row ball bearing 3 have the same width, and they both have a fixed width in the radial direction. For the two rows of balls 31, 32 of the double-row ball bearing 3, the balls 31 of one row and the balls 32 of the other row have the same ball diameter, and they are arranged at the same position in radial direction.

The two outer rings 6, 7 of the double-row ball bearing 3 have the same width on the radially inner side having the raceways, however, the widths on the radially outer side (on the housing 2 side) are different. For one outer ring (first outer ring) 6, the width of the radially outer section 62 is narrower than that of the radially inner section 61. For the other outer ring (second outer ring) 7, the width of the radially outer section 72 is greater than that of the radially inner section 71. Therefore, the width of the radially outer section 72 of the second outer ring 7 is wider than the radially outer section 62 of the first outer ring 6. The radially outer section 72 of the second outer ring 7 protrudes outward in the axial direction (upward in FIG. 2) from the second inner ring 5.

The outer peripheral surface of the radially outer section 72 of the second outer ring 7 is bonded to the outer peripheral member 21 of the housing 2. The outer peripheral surface of the radially outer section 62 of the first outer ring 6 is not bonded to the outer peripheral member 21 of the housing 2. The outside surface (side opposite from the pre-load adjustment space S side) of the first outer ring 6 is supported by the side-surface member 22 of the housing 2. Here, this side-surface member 22 corresponds to the support member of this embodiment. The two inner rings 4, 5 fit at a fixed gap on the shaft 1. Moreover, the outside surface of the second inner ring 5 is supported by the support member 8.

As described above, in this bearing device, the position of the first outer ring 6 is fixed by the side-surface member (support member) 22, the width of the radially outer section 62 of the first outer ring 6 is much less than the width of the radially outer section 72 of the second outer ring 7, and the wide radially outer section 72 of the wide second outer ring 7 is fastened with adhesion to the outer peripheral member 21 of the housing 2. Accordingly, with this bearing device, the first outer ring 6 does not move even when the width of the double-row ball bearing 3 is very small, that is 2 mm or less, thus it is possible to obtain sufficient bonding strength with the second outer ring 7.

The outer peripheral surface of the radially outer section 62 of the first outer ring 6 may be fastened with adhesion to the outer peripheral member 21 of the housing 2.

Figure 3:
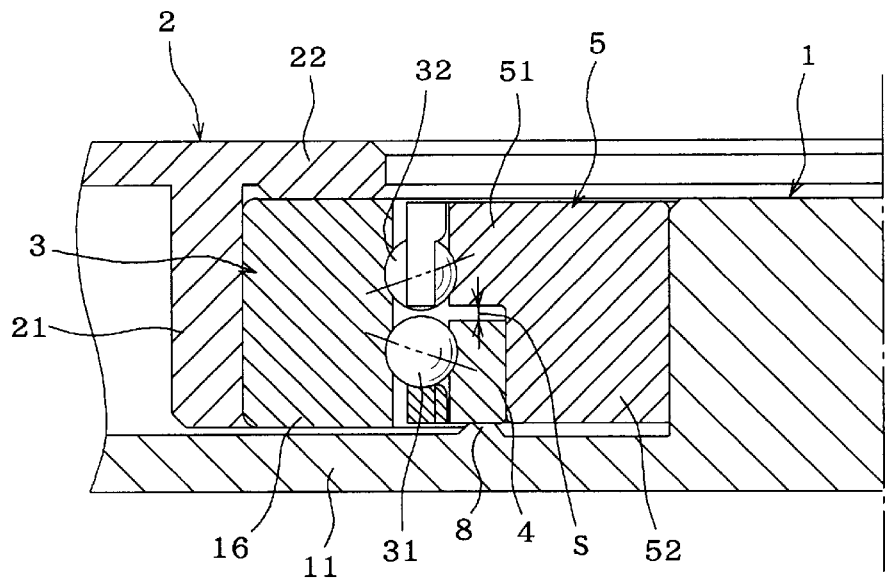
FIG. 3 is a cross sectional view of part of a bearing device according to a third example of the embodiment of the present invention.

FIG. 3 is a cross-sectional drawing showing the bearing device of a third example of the embodiment of this invention.

This bearing device comprises a shaft 1, a housing 2 and double-row ball bearing 3. The double-row ball bearing 3 is set between the shaft 1 and the housing 2 such that it is pre-loaded by a fixed-position pre-loading method.

In this bearing device, the double-row ball bearing 3 has two, first and second inner rings 4, 5 which are arranged with a gap S for adjusting the pre-load. Moreover, in this double-row ball bearing 3 there is one outer ring 16, and there are two raceways formed on the inner peripheral surface of this outer ring 16. For the two rows of balls 31, 32 of the double-row ball bearing 3, both rows of balls 31, 32 have the same ball diameter, and they are arranged at the same position in the radial direction.

At one end of the shaft 1 in the lengthwise direction, there is a circular disk-shaped member 11 that is integrated with the shaft 1. On the surface of the shaft 1 side of this circular disk-shaped member 11, there is a support member 8 for supporting the outside surface (the side surface opposite from the space S side) of the first inner ring 4 in the pre-load direction. Moreover, the housing 2 comprises an outer peripheral member 21 for supporting the outer peripheral surface of the outer ring 16, and a side member 22 for supporting the outside surface of the outer ring 16.

Of the two inner rings 4, 5 of the double-row ball bearing 3, the inner diameter of the first inner ring 4 is formed such that it is larger than the outer diameter of the shaft 1, and the inner diameter of the second inner ring 5 is formed such that it is nearly the same as the outer diameter of the shaft 1. In addition, the second inner ring 5 comprises a radially outer section 51, that has the same width as the first inner ring 4, and a radially inner section 52, that has a width that is substantially equal to the length of the shaft 1. This radially inner section 52 of the second inner ring 5 protrudes in the axial direction into the first inner ring 4 side (downward in FIG. 3). In other words, the first inner ring 4 is located such that the second inner ring 5 is surrounded by the inner peripheral surface of the first inner ring 4. Also, the inner peripheral surface of the second inner ring 5 fits entirely over the lengthwise direction of the shaft 1.

The inner peripheral surface of the radially inner section 52 of the second inner ring 5 is bonded to the shaft. The outer peripheral surface of the radially inner section 52 of the second inner ring 5 is not bonded to the inner peripheral surface of the first inner ring 4. The outside (axially outer) surface of the first inner ring 4 is supported by the support member 8. Moreover, the outer peripheral surface of the outer ring 16 fits to the outer peripheral member 21 of the housing 2 with a fixed gap, and the outer surface of the axially outer ring 16 is pressed to the side-surface member 22 of the housing 2.

As described above, in this bearing device, the position of the first inner ring 4 is fixed by the support member 8, and the radially inner section 52 of the second inner ring 5, with a width equal to the length of the shaft 1, is fastened to the shaft 1 with adhesion. Moreover, with this bearing device, there is no movement of the first inner ring 4 even when the width of the double-row ball bearing 3 is very small, that is 2 mm or less, thus it is possible to obtain sufficient bonding strength with the second inner ring 5.

Also, with this bearing device, two raceway grooves are formed in the one outer ring 16, so that is particularly effective in making it possible to reduce the relative angle between the outer raceway grooves in both rows, and improving the vibration precision.

The inner peripheral surface of the radially inner section 42 of the first ring 4 may be fastened with adhesion to the outer peripheral surface of the second inner ring 5.

Figure 4:
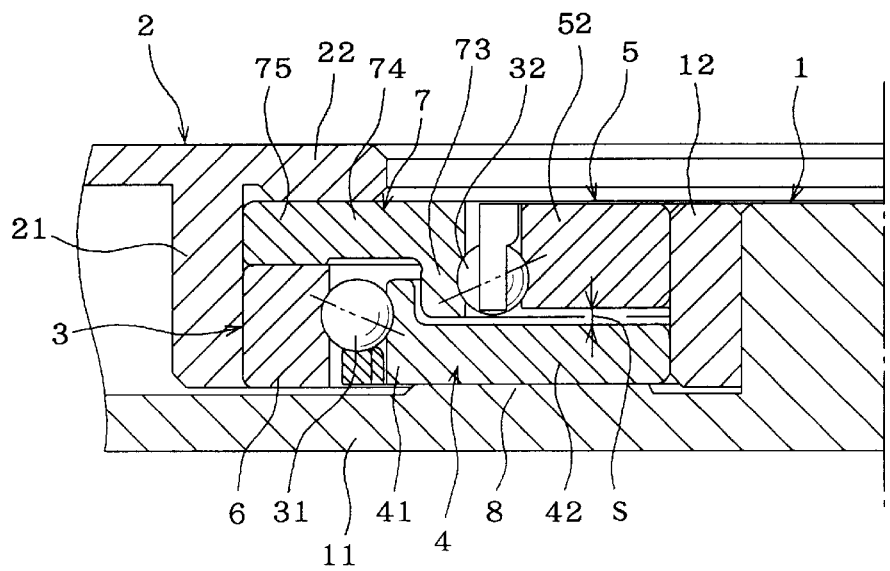
FIG. 4 is a cross sectional view of part of a bearing device according to a fourth example of the embodiment of the present invention.

FIG. 4 is a cross-sectional drawing showing the bearing device of a fourth example of this invention.

This bearing device comprises a shaft 1, a housing 2, a double-row ball bearing 3, and a ring-shaped member 12. The double-row ball bearing 3 is set between the shaft 1 and the housing 2 by way of the ring-shaped member 12 such that it is pre-loaded by a fixed-position pre-loading method. In the bearing device, the double-row ball bearing 3 has first and second inner rings 4, 5 which are arranged with a gap S for adjusting the pre-load, and first and second outer rings 6, 7 which are arranged such that they are directly pressed.

On one end of the shaft 1 in the lengthwise direction, there is a circular disk-shaped member 11 that is integrated with the shaft 1. On the surface on the shaft 1 side of this circular disk-shaped member, there is a support member 8 for supporting the outside surface (side surface opposite the space S) of the first inner ring 4 in the pre-load direction. The housing 2 comprises an outer peripheral member 21 for supporting the outer peripheral surface of the two outer rings 6, 7, and an side-surface member 22 for supporting the outside surface of the second outer ring 7.

The two rows of balls 31, 32 of the double-row ball bearing 3 are arranged such that they are separated from each other in the radial direction (left and right directions in FIG. 4) of the bearing. One row (first) of balls 31 is located further on the outside in the radial direction of the bearing than the other row (second row) of balls 32. The difference between the diameter of the pitch circle of the first balls 31 and the diameter of the pitch circle of the second balls 32 is approximately four times the diameter of the balls 31, 32. The two rows of balls 311, 32 are arranged in the axial direction such that they are located at position separated by just the radius of the balls 31, 32 with respect to the distance between the centers of the balls 31, 32.

The first outer ring 6 has a normal outer ring shape, however, the second outer ring 7 comprises a radially inner section 73 having a raceway, a radially intermediate section 74 that is located at the position of the first row of balls 31 in the radial direction, and a radially outer section 75 that is pressed by one side surface of the first outer ring 6. The width of the first outer ring 6 is formed such that it is larger than the width of the radially outer section 75 of the second outer ring 7.

The second inner ring 5 has a normal inner ring shape, however the first inner ring 4 comprises a radially outer section 41 having a raceway, and an radially inner section 42 on the shaft 1 side. The width of the radially inner section 42 of the first inner ring 4 is formed such that it is narrower than the width of the radially outer section 41. The width of the second inner ring 5 is formed such that it is larger than the width of the radially inner section 42 of the first inner ring 4.

The radially inner section 42 of the first inner ring 4, the radially inner section 73 of the second outer ring 7, the second row of balls 32, and the second inner ring 5 are arranged such that they face each other with a fixed gap therebetween. Moreover, the first outer ring 6 and the radially outer section 75 of the second outer ring 7 are arranged such that they come in contact with each other in the axial direction. Also, a fixed gap is formed between the radially outer section 41 of the first inner ring 4 and the outer peripheral surface of the radially inner section 73 of the second outer ring 7, and between the radially the radially outer section 41 of the first inner ring 4 and the inside (axially inner) surface of the radially intermediate section 74 of the second outer ring 7, respectively.

The inner peripheral surface of the second inner ring 5 is bonded to the ring-shaped member 12 for fastening. The inner peripheral surface of the radially inner section 42 of the first inner ring 4 is not bonded to the ring-shaped member 12. The ring-shaped member 12 is bonded to the shaft 1 for fastening. The outer surface of the first inner ring 4 is supported by the support member 8. The outer peripheral surface of the two outer rings 6, 7 fits with a fixed gap to the outer peripheral member 21 of the housing 2. Moreover, the outer surface of the second outer ring 7 is pressed by the side-surface member 22 of the housing 2. The outer peripheral surface of the two outer rings 6, 7 may be fastened to the outer peripheral member 21 of the housing 2 by thermal shrinkage fitting.

As described above, in this bearing device, the position of the first inner ring 4 is fixed by the support member 8, the width of the radially inner section 42 of the first inner ring 4 is less than the width of the radially inner section 52 of the second inner ring 5, and the wide radially inner section 52 of the wide second inner ring 5 is fastened to the ring-shaped member 12 with adhesion. Also, with this bearing device, there is no movement of the first inner ring 4 even when the width of the double-row ball bearing 3 is very small, that is 2 mm or less, thus it is possible to obtain sufficient bonding strength with the second inner ring 5.

In addition, with this bearing device, by separating the locations of the two rows of balls 31, 32 from each other in the radial direction of the bearing and by placing the first inner ring 4 and the second outer ring 7 such that the radially outer section 41 of the first inner ring 4 is further outside in the radial direction than the radially inner section 73 of the outer ring 7, it is possible to make the width of the double-row ball bearing less than in the cases of first and third examples. Also, since there is a ring-shaped member 12 between the inner rings 4, 5 and the shaft 1, it is possible to adjust the pre-load before installing the shaft 1.

The inner peripheral surface of the radially inner section 42 of the first inner ring 4 may be fastened with adhesion to the ring-shaped member 12.

Figure 5:
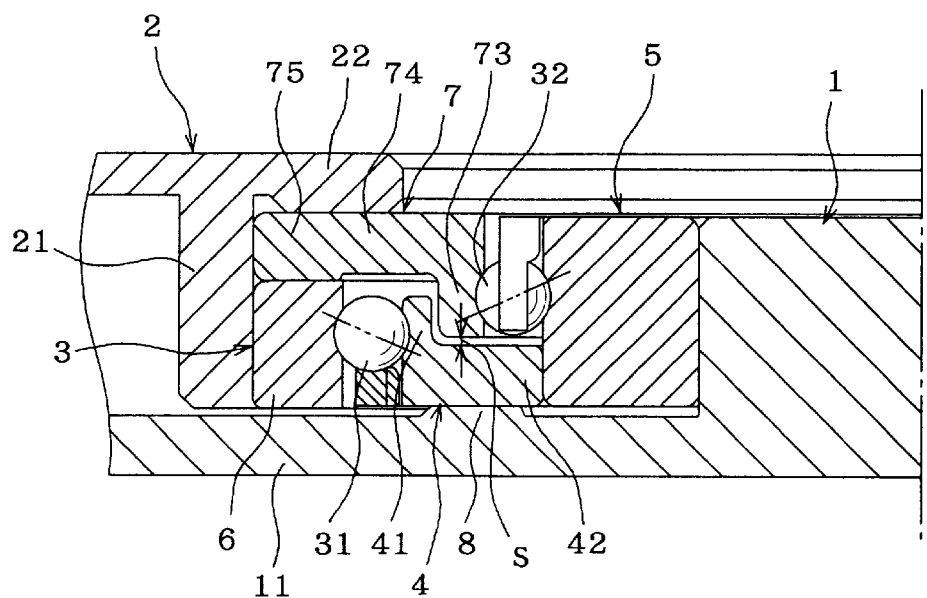
FIG. 5 is a cross sectional view of part of a bearing device according to a fifth example of the embodiment of the present invention.

FIG. 5 is a cross-sectional drawing showing the bearing device of a fifth example of this invention.

This bearing device comprises a shaft 1, a housing 2 and double-row ball bearing 3. The double-row ball bearing 3 is set between the shaft 1 and the housing 2 such that it is pre-loaded by a fixed-position pre-loading method. This double-row ball bearing 3 has first and second inner rings 4, 5 and first and second outer rings 6, 7, where the first inner ring 4 is arranged such that the second inner ring 5 is generally surrounded by the inner peripheral surface at the first inner ring 4. The width of the second inner ring 5 is equal to the length of the shaft 1, and the width of the radially inner section 42 of the first inner ring 4 is ⅓ the width of the second inner ring 5.

The two rows of balls 31, 32 of the double-row ball bearing 3 are located such that they are separated from each other in the radial direction of the bearing. The balls 31 of one row (first row) is located further outside in the radial direction of the bearing than the balls 32 of the other row (second row). The difference in the diameter between the pitch circle of the balls 31 and the pitch circle of the balls 32 is approximately 4 times the diameter of the balls 31, 32. The two rows of balls 31, 32 are arranged in the axial direction such that they are located at positions separated by just the radius of the balls 31, 32 with respect to the distance between the centers of the balls 31, 32.

The first outer ring 6 has a normal outer ring shape, however, the second outer ring 7 comprises a radially inner section 73 having a raceway, a radially intermediate section 74 that is located at the position of the first row of balls 31 in the radial direction, and a radially outer section 75 that is pressed by the side surface of the first outer ring 6. The width of the first outer ring 6 is formed such that it is larger than the width of the radially outer section 75 of the second outer ring 7.

The second inner ring 5 has a normal inner ring shape, however, the first inner ring 4 comprises a radially outer section 41 having a raceway, and a radially inner section 42 on the shaft 1 side. The width of the radially inner section 42 of the first inner ring 4 is formed such that it is narrower than the width of the radially outer section 41. The width of the second inner ring 5 is formed such that it is larger than the width of the radially inner section of the first inner ring 4.

The radially inner section 42 of the first inner ring 4, the radially inner section 73 of the second outer ring 7 and the second row of balls 32 are arranged such that they face each other though a fixed gap therebetween. The first outer ring 6 and the radially outer section 75 of the second outer ring 7 are arranged such that they come in contact with each other in the axial direction. In other words, the two outer rings 6, 7 are arranged such that they are directly pressed to each other.

A gap S for adjusting the pre-load is axially formed between the radially inner section 42 of the first inner ring 4 and the radially inner section 73 of the second outer ring 7. Moreover, a fixed gap is formed between the radially outer section 41 of the first inner ring 4 and the outer peripheral surface of the radially inner section 73 of the second outer ring 7, and between the radially outer section 41 of the first inner ring 4 and the inside surface of the radially intermediate section 74 of the outer ring 7, respectively.

On one end in the lengthwise direction of the shaft 1 there is a circular disk-shaped member 11 that is integrated with the shaft 1. On the surface on the shaft 1 side of this circular disk-shaped member 11, there is a support member 8 that supports the outer surface of the first inner ring 4 (surface on the opposite side of the gap S) in the pre-load direction. The housing 2 comprises an outer peripheral member 21 that supports the outer peripheral surface of the two outer rings 6, 7, and a side-section member 22 that supports the outside surface of the second outer ring 7.

The inner peripheral surface of the second inner ring 5 is bonded to the shaft 1 across the entire length of the shaft 1. The inner peripheral surface of the radially inner section 42 of the first inner ring 4 is not bonded to the outer peripheral surface of the second inner ring 5. The outside surface of the first inner ring 4 is supported by the support member 8. The two outer rings 6, 7 fit on the outer peripheral member 21 of the housing 2 with a fixed gap therebetween. Moreover, the outside surface of the second outer ring 7 is pressed by the side-surface section 22 of the housing 2.

As described above, in this bearing device, the position of the first inner ring 4 is fixed by the support member 8, and the second inner ring 5 is fastened with adhesion to the shaft 1 along its width which is equal to the length of the shaft 1. Also, there is no movement of the first inner ring 4 even when the width of the double-row ball bearing 3 is very small, that is 2 mm or less, thus it is possible to obtain sufficient bonding strength with the second inner ring 5.

In addition, with this bearing device, by shifting the location of the two rows of balls 31, 32 in the radial direction of the bearing and placing the first inner ring 4 and second outer ring 7 such that the radially outer section 41 of the inner ring 4 is further outside in the radial direction than the radially inner peripheral section 73 of the outer ring 7, the width of the double-row ball bearing 3 becomes smaller than in the first to third examples. Moreover, since the first inner ring 4 is on the outside of the second inner ring 5, it is possible to adjust there-load before attaching it to the shaft 1.

The inner surface of the radially inner section 42 of the first inner ring may be fastened to the outer peripheral surface of the second inner ring 5.

Figure 6:
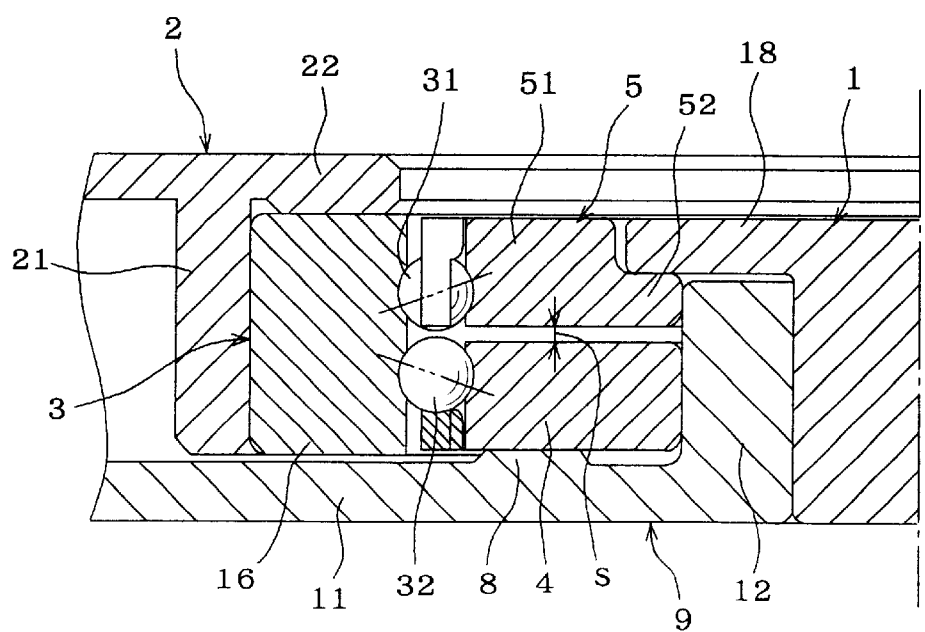
FIG. 6 is a cross sectional view of part of a bearing device according to a sixth example of the embodiment of the present invention.

FIG. 6 is a cross-sectional drawing showing the bearing device of a sixth example of the embodiment of this invention.

This bearing device comprises a shaft 1, a housing 2, a double-row ball bearing 3, and a fourth member 9. The double-row ball bearing 3 is set between the fourth member 9, the shaft 1 and the housing 2 such that it is pre-loaded by a fixed-position pre-loading method.

In this bearing device, the double-row ball bearing 3 has first and second inner rings 4, 5 which are arranged with a gap S for adjusting the pre-load. The width (dimension in the axial direction) of the first inner ring 4 is the same in the radial direction, however the second inner ring 5 comprises a radially outer section 51 that has the same width (dimension in the axial direction) as the first inner ring 4, and a radially inner section 52 that is narrower than this. Moreover, in this double-row ball bearing 3 there is one outer ring 16, and there are two raceways formed on the inner peripheral surface of this outer ring 16. For the two rows of balls 31, 32 of the double-row ball bearing 3, both rows of balls 31, 32 have the same ball diameter, and they are arranged at the same position in the radial direction.

The housing 2 comprises an outer peripheral member 21 for supporting the outer peripheral surface of the outer ring 16, and a side-surface member 22 for supporting the outside surface of the outer ring 16 on the side of the second inner ring 5.

The fourth member 9 comprises a ring-shaped member 12 that is located between the inner peripheral surfaces of the inner rings 4, 5 and the shaft 1, and a circular disk-shaped member 11 that is located on one end of the shaft 1 (on the side of the first inner ring 4) such that it is integrated with the shaft 1. On the shaft 1 side of this circular disk-shaped member 11, there is a support member 8 that is formed such that it supports the outside surface (surface opposite to the gap S) of the first inner ring 4 in the pre-load direction.

On the other end (on the side of the second inner ring 5) of the shaft 1 in the lengthwise direction, there is a flange 18 that protrudes outward in the radial direction than the ring-shaped member 12. The width of the radially inner section 52 of the second inner ring 5 is less than the width of the radially outer peripheral section 51 by just the amount of the thickness of the flange 18. Also, the flange 18 and the outside surface of the radially inner section 52 of the second inner ring 5 come in contact with each other. There is a fixed gap between the inner peripheral surface of the radially outer section 51 of the second inner ring 5 and the outer peripheral surface of the flange 18. Moreover, there is a fixed gap between the axial end surface on the flange 18 side of the ring-shaped member 15 and the flange 18.

The dimension (length) in the axial direction of the inner peripheral surface of the ring-shaped member 12 is two times or more than the dimension (width) in the axial direction of the first inner ring 4. This ring-shaped member 12 is bonded to the shaft 1. The inner peripheral surface of the radially inner section 52 of the second inner ring 5 is not bonded to the ring-shaped member 12. The inner peripheral surface of the first inner ring 4 is not bonded to the ring-shaped member 12. The outside surface of the first inner ring 4 is supported by the support member 8. The outer ring 16 fits with the radially outer section 21 of the housing 2. Moreover, the outside surface of the outer ring 16 is pressed to the side-surface member 22 of the housing 2.

As described above, in this bearing device, the length of the inner peripheral surface of the ring-shaped member 12 is greater than the width of the first inner ring 4, and this ring-shaped member 12 is fastened with adhesion to the shaft 1. Moreover, the position of the second inner ring 5 is fixed by the flange 8, and the position of the first inner ring 4 is fixed by the support member 8. Also, with this bearing device, there is no movement of the first inner ring 4 and second inner ring 5 even when the width of the double-row ball bearing 3 is very small, that is 2 mm or less, thus it is possible to obtain sufficient bonding strength with the ring-shaped member 12.

The inner peripheral surface of the radially inner section 52 of the second inner ring 5 and the peripheral inner surface of the first inner ring 4 may be bonded to the outer peripheral surface of the ring-shaped member 12.

Figure 7:
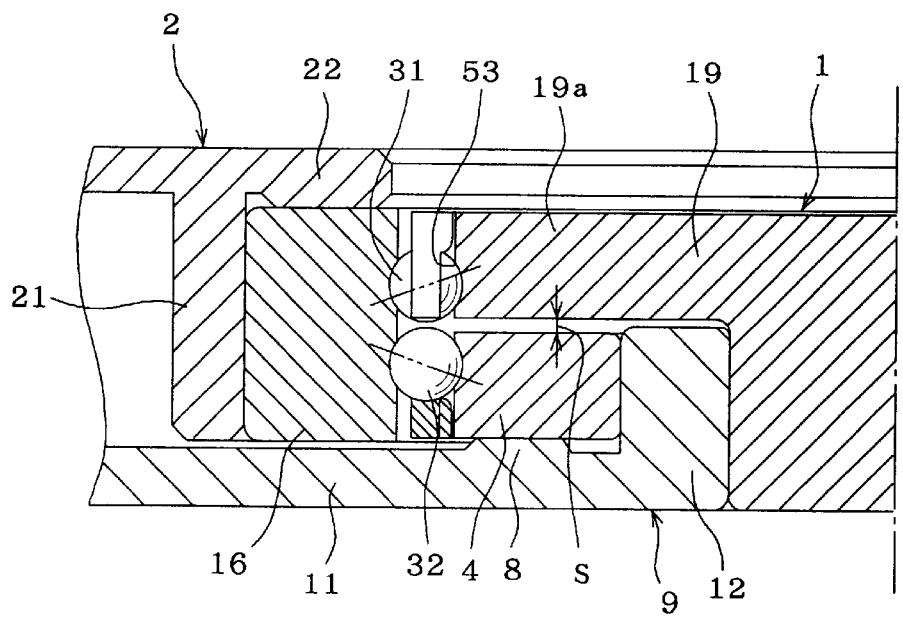
FIG. 7 is a cross sectional view of part of a bearing device according to a seventh example of the embodiment of the present invention.

FIG. 7 is a cross-sectional drawing showing the bearing device of a seventh example of this invention.

This bearing device comprises a shaft 1, a housing 2, a double-row ball bearing 3, and a fourth member 9. The double-row ball bearing 3 is set between the fourth member 9, the shaft 1 and the housing 2 such that it is pre-loaded by a fixed-position pre-loading method. In this bearing device, there is a flange 19 at one end of the shaft 1 in the lengthwise direction, and by forming a raceway 53 on, the outer peripheral surface of this flange 19, the function of an inner race is given to the radially outer section 19a of this flange 19.

This double-row ball bearing 3 further comprises an inner ring 4 (first inner ring) having a width that is the same dimension as the thickness (dimension in the axial direction) as the flange 19, and an outer ring 16 that has two raceways formed around its inner peripheral surface. This inner ring 4 and the radially outer section 19a of the flange 19, that functions as another inner ring, are arranged with a gap S for adjusting the pre-load.

Moreover, for the two rows of balls 31, 32 of the double-row ball bearing 3, both rows of balls 31, 32 have the same ball diameter, and they are arranged at the same position in the radial direction.

The housing 2 comprises an outer peripheral member 21 for supporting the outer peripheral surface of the outer ring 16, and a side-surface member for supporting the outside surface of the outer ring 16 on the side of the second inner ring 5.

The fourth member 9 comprises a ring-shaped member 12 that is located between the inner peripheral surface of the inner ring 4 and the shaft 1, and a circular disk-shaped member 11 that is located on one end of the shaft 1 (on the side of the inner ring 4) such that it is integrated with the shaft 1. On the shaft 1 side of this circular disk-shaped member 11, there is a support member 8 that is formed such that it supports the outside surface (the surface opposite to the gap S) of the inner ring 4 in the pre-load direction.

The dimension (length) in the axial direction of the inner peripheral surface of the ring-shape member 12 is greater than the dimension (width) in the axial direction of the first inner ring 4 by just the amount of the thickness of the circular disk-shaped member 11. The ring-shaped member 12 is bonded to the shaft 1. The inner peripheral surface of the inner ring 4 is not bonded to the ring-shaped member 12. The outside surface of the inner ring 4 is supported by the support member 8. There is a fixed gap between the axial end surface on the flange 19 side of the ring-shaped member 12 and the flange 19. The outer peripheral surface of the outer ring 16 fits with the outer peripheral member 21 of the housing 2. Moreover, the outside surface of the outer ring 16 is pressed to the side-surface member 22 of the housing 2.

As described above, in this bearing device, the length of the inner peripheral surface of the ring-shaped member 12 is greater than the width of the first inner ring 4, and this ring-shaped member 12 is fastened with adhesion to the shaft 1. Also, by having the radially outer section 19a of the flange 19 function as a second inner ring, the position of the second inner ring is fixed by the shaft 1, and the position of the first inner ring 4 is fixed by the support member 8. Moreover, with this bearing device, there is no movement of the first inner ring 4 and the second inner ring (radially outer section 19a of the flange 19) even when the width of the double-row ball bearing 3 is very small, that is 2 mm or less, thus it is possible to obtain sufficient bonding strength with the ring-shaped member 12.

In addition, with this bearing device, since the radially outer section 19a of the flange 19 on the shaft 1 functions as the second inner ring 5, stability of the bearing is increased when an external load is applied, when compared with the bearing device of the sixth example.

The inner peripheral surface of the inner ring 4 may be bonded to the outer peripheral surface of the ring-shaped member 15.

Figure 8:
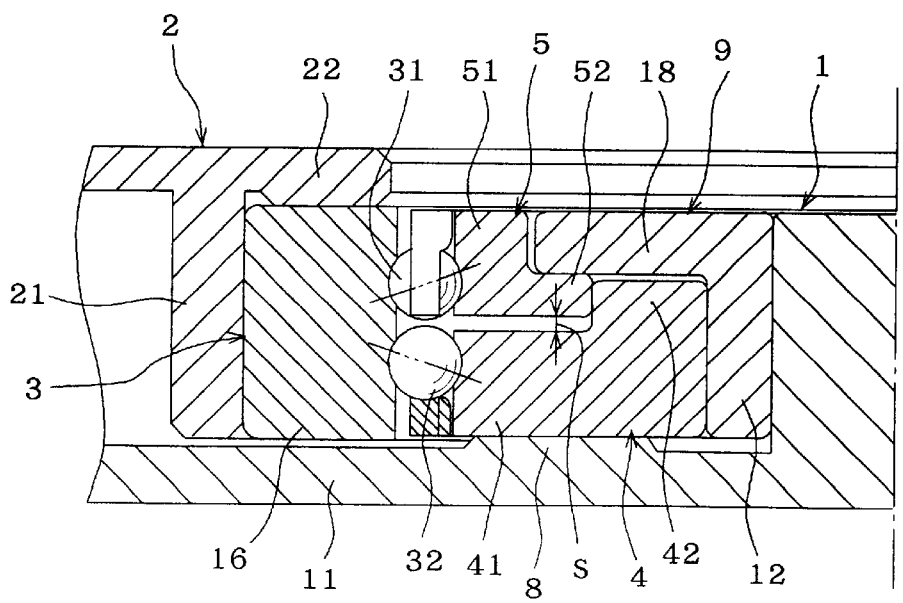
FIG. 8 is a cross sectional view of part of a bearing device according to a eighth example of the embodiment of the present invention.

FIG. 8 is a cross-sectional drawing showing the bearing device of an eighth example of this invention.

This bearing device comprises a shaft 1, a housing 2, a double-row ball bearing 3, and a fourth member 9. The double-row ball bearing 3 is set, through the fourth member 9, between the shaft 1 and the housing 2 such that it is pre-loaded by a fixed-position pre-loading method. In this bearing device, the double-row ball bearing 3 has first and second inner rings 4, 5 which are arranged with a gap S for adjusting the pre-load.

Moreover, in this double-row ball bearing 3 there is one outer ring 16, and there are two raceways formed on the inner peripheral surface of this outer ring 16. For the two rows of balls 31, 32 of the double-row ball bearing 3, both rows of balls 31, 32 have the same ball diameter, and they are arranged at the same position in the radial direction.

On one end of the shaft 1 in the lengthwise direction, there is a circular disk-shaped member 11 that is integrated with the shaft 1. On the shaft 1 end of this circular disk-shaped member 11, there is a support member 8 that is formed such that it supports the outside surface (surface opposite the gap S) of the first inner ring 4 in the pre-load direction. The housing 2 comprises an outer peripheral member 21 for supporting the outer peripheral surface of the outer ring 16, and a side-surface member 22 for supporting the outside surface of the outer ring 16.

The fourth member 9 comprises a ring-shaped member 12 that fits entirely around the length of the shaft 1, and a flange 18 that is located at one end in the lengthwise direction of the ring-shaped member 12 and is integrated with the ring-shaped member 12.

The two inner rings 4, 5 of the double-row ball bearing 3 have the same width (dimension in the axial direction) on the radially inner section having raceways, however, the widths of the radially inner section (on the shaft 1 side) differ. The width of the radially inner section 42 of the first inner ring 4 is wider than the width of the radially outer section 41. The width of the radially inner section 52 of the second inner ring 5 is narrower than the width of the radially outer section 51. The outer diameter of the radially inner section 42 of the first inner ring 4 is formed such that it is the same as the inner diameter of the radially inner section 52 of the second inner ring 5.

The inner diameter of the radially inner section 42 of the first inner ring 4 is formed such that it is the same as the outer diameter of the ring-shaped member 12. The inner diameter of the radially outer section 51 of the second inner ring 5 is formed such that it is greater than the outer diameter of the flange 18. The flange 18 comes in contact with the outside surface of the radially inner section 52 of the second inner ring 5.

The outer peripheral surface of the radially inner section 42 of the first inner ring 4 is not bonded to the inner peripheral surface of the radially inner section 52 of the second inner ring 5. The inner peripheral surface of the radially inner section 42 of the first inner ring 4 is bonded to the outer peripheral surface of the ring-shaped member 12. There is a fixed gap between the inner peripheral surface of the radially outer section 51 of the second inner ring 5 and the outer peripheral surface of the flange 18. There is a fixed gap between the radially inner section 42 of the first inner ring 4 and the flange 18.

The outside surface of the first inner ring 4 is supported by the support member 8. The outer ring 16 fits with the outer peripheral member 21 of the housing 2. Also, the outside surface of the outer ring 16 is pressed to the side-surface member 22 of the housing 2.

As described above, in this bearing device, the position of the second inner ring 5 is fixed by the flange 18, and the position of the first inner ring 4 is fixed by the support member 8. Also, the wide radially inner section 42 of the first inner ring 4 is fastened with adhesion to the ring-shaped member 12. Moreover, with this bearing device, there is no movement on the first inner ring 4 or second inner ring 5 even when the width of the double-row ball bearing 3 is very small, that is 2 mm or less, thus it is possible to obtain sufficient bonding strength with the ring member 12.

In addition, with this bearing device, since the ring-shaped member 12 is located between the inner rings 4, 5 and the shaft 1, it is possible to adjust the pre-load before attachment to the shaft 1.

The inner peripheral surface of the radially inner section 52 of the second inner ring 5 may be fastened with adhesion to the outer peripheral surface of the radially inner section 42 of the first inner ring 4.

Figure 9:
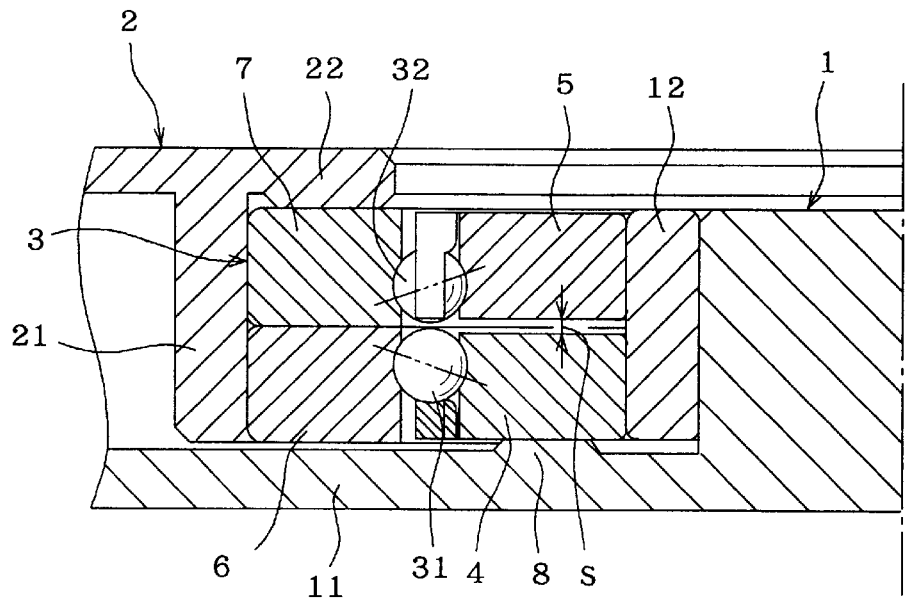
FIG. 9 is a cross sectional view of part of a bearing device according to a ninth example of the embodiment of the present invention.

FIG. 9 is a cross-sectional drawing showing the bearing device of a ninth example of the embodiment of this invention.

This bearing device comprises a shaft 1, a housing 2, a double-row ball bearing 3, and a ring-shaped member 12. The double-row ball bearing 3 is set between the shaft 1 and the housing 2 by way of the ring-shaped member 12 such that it is pre-loaded by a fixed-position pre-loading method. In this bearing device, the double-row ball bearing 3 has first and second inner rings 4, 5 which are arranged with a gap S for adjusting the pre-load, and first and second outer rings 6, 7 which are located such that they are pressed directly to each other.

On one end of the shaft 1 in the lengthwise direction, there is a circular disk-shaped member 11 that is integrated with the shaft 1. On the shaft 1 side of this circular disk-shaped member 11, there is a support member 8 that is formed such that it supports the outside surface (surface opposite the gap S) of the first inner ring 4. The housing 2 comprises an outer peripheral member 21 for supporting the outer peripheral surface of the two outer rings 6, 7, and a side-surface member 22 for supporting the outside surface of the second outer ring 7.

The two inner rings 4, 5 of the double-row ball bearing 3 have the same width, and are formed such that they have a constant width in the radial direction. The two outer rings 6, 7 of the double-row ball bearing 3 have the same width, and are formed such that they have a constant width in the radial direction. The two rows of balls 31, 32 of the double-row ball bearing 3 are such that one row of balls 31 and the other row of balls 32 have the same ball diameter and are located at the same position in the radial direction.

The inner peripheral surface of the second inner ring 5 is fixed by pressure-fitting or by pressure-fitting and adhesion into the ring-shaped member 12. The inner peripheral surface of the first inner ring 4 is not bonded to the ring-shaped member 12. The outside surface of the first inner ring 4 is supported by the support member 8. The two outer rings 6, 7 fit with the outer peripheral member 21 of the housing 2. Also, the outside surface of the second outer ring 7 is pressed to the side-surface member 22 of the housing 2.

As described above, in this bearing device, the position of the first inner ring 4 is fixed by the support member 8, and the inner peripheral surface of the second inner ring 5 is fastened with adhesion to the shaft 1. The inner peripheral surface of the first inner ring 4 may be bonded to the ring-shaped member 12. Moreover, since the ring-shaped member 12 is located between the inner rings 4, 5 and the shaft 1, it is possible to adjust the pre-load before attachment to the shaft 1.

Figure 10:
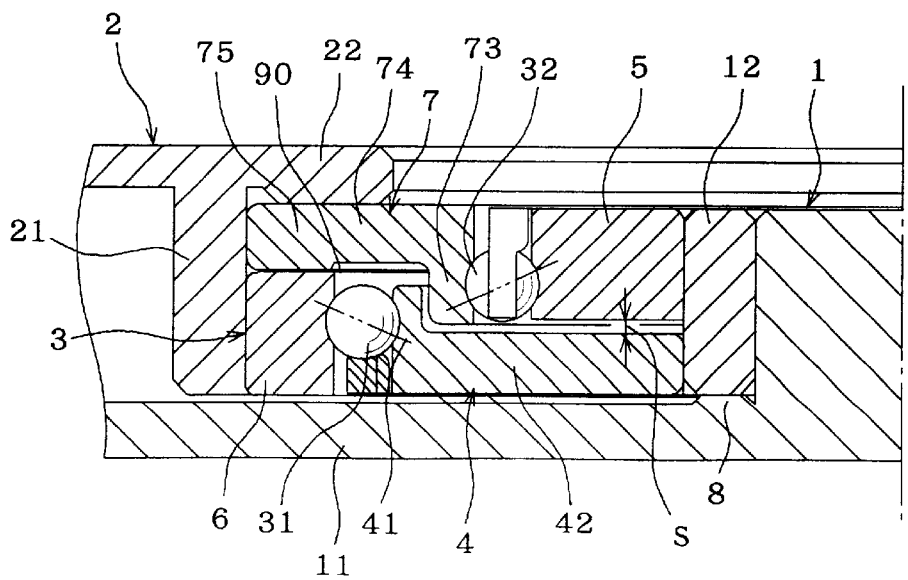
FIG. 10 is a cross sectional view of part of a bearing device according to a tenth example of the embodiment of the present invention.

FIG. 10 is a cross-sectional drawing showing a double-row ball bearing device of a tenth example of this invention.

The double-row ball bearing 3 comprises first and second inner rings 4, 5 and first and second outer rings 6, 7, and is set between the shaft 1 and the housing 2 such that it is pre-loaded by a fixed-position pre-loading method.

The two rows of balls 31, 32 of the double-row ball bearing 3 are located such that they are displaced from each other in the radial direction of the bearing. The ball diameter of the balls 31 of one row is the same as that of the balls 32 of the other row. One row (first row) of balls 31 is located further outside in the radial direction of the bearing than the other row (second row) of balls 32. The difference between the diameter of the pitch circle of the first balls 31 and the diameter of the pitch circle of the second balls 32 is approximately 4 times the diameter of the balls 31, 32. The two rows of balls 31, 32 are located such that the distance between the centers of the balls 31, 32 separated in the axial direction is equal to the radius of the balls 31, 32.

The first outer race 6 has a normal outer ring shape, however, the second outer race 7 comprises a radially inner section 73 having a raceway, a radially intermediate section 74 that is located in the radial direction in the position of the first row of balls 31, and a radially outer section 75 that is located such that it faces the inside surface of the first outer ring 6. The second outer ring 7 is formed such that the width of the radially outer section 75 is less than the width of the radially inner section 73.

Moreover, the width of the first outer ring 6 is formed such that it is larger than the width of the radially outer section 75 of the second outer ring 7. There is a seal 90 located between the inside surface of the first outer ring 6 and the radially outer section 75 of the second outer ring 7.

The second inner ring 5 has a normal inner ring shape, however, the first inner ring 4 comprises a radially outer section 41 having a raceway, and a radially inner section 42 on the shaft 1 side. The first inner ring 4 is formed such that the width of the radially inner section 42 is less than the width of the radially outer section 41, and the dimension of the radially inner section 42 in the radial direction is larger than the radially outer section 41.

The radially inner section 42 of the first inner ring 4 and the second inner ring 5 are arranged with a gap S for adjusting the pre-load, and they are arranged such that they face each other in the axial direction. The first inner ring 4 and the second inner 5 have the same inner diameter, and are both pressure fitted into the ring-shaped member (gap-retaining member) 12. This ring-shaped member 12 fits over the shaft 1.

The radially outer section 41 of the first inner ring 4 is located further outside in the radial direction than the radially inner section 73 of the second outer ring 7. There is a fixed gap for preventing interference between the radially outer section 41 of the first inner ring 4 and the outer peripheral surface of the radially inner section 73 of the second outer ring 7.

There is a fixed gap for preventing interference in the axial direction between the radially inner section 42 of the first inner ring 4 and the second row of balls 32. There is a fixed gap for preventing interference in the axial direction between the radially intermediate section 74 of the second outer ring 7 and the first row of balls 31. Moreover, there is a seal 90 located in this gap between the radially intermediate section 74 and the balls 31. In addition, there is a fixed gap for preventing interference in the axial direction between the radially outer section 41 of the first inner ring 4, and the radially intermediate section 74 of the second outer ring 7.

On one end of the shaft 1 in the lengthwise direction, there is a circular disk-shaped member 11 that is integrated with the shaft 1. On the shaft 1 side of this circular disk-shaped member 11, there is a support member 8 that is formed such that it supports the inside surface of the ring-shaped member 12. The housing 2 comprises an outer peripheral member 21 for supporting the outer peripheral surface of the two outer rings 6, 7, and a side-surface member 22 for supporting the outside surface of the second outer ring 7.

Figure 14:
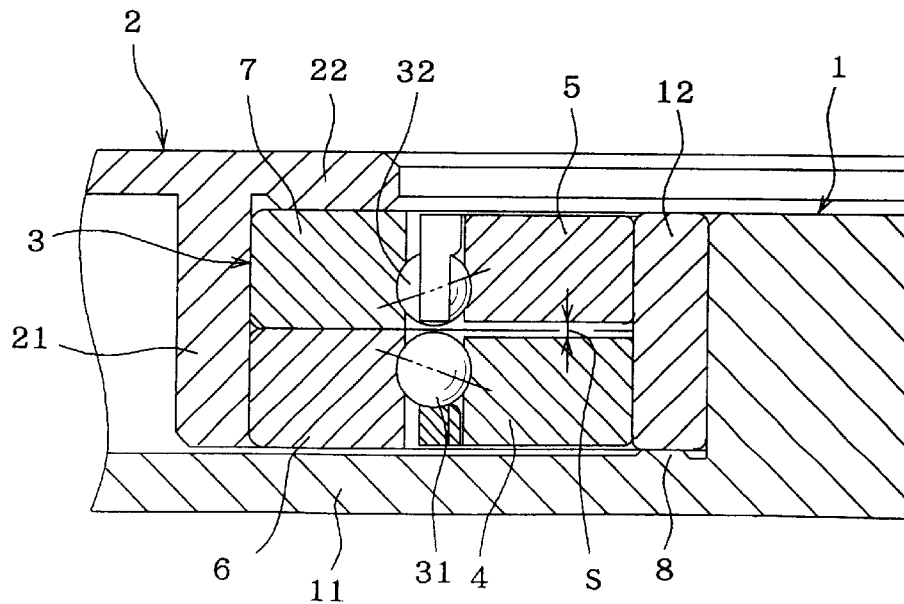
FIG. 14 is a cross sectional view of part of a bearing device according to a comparative example of the embodiment of the present invention.
Figure 15:
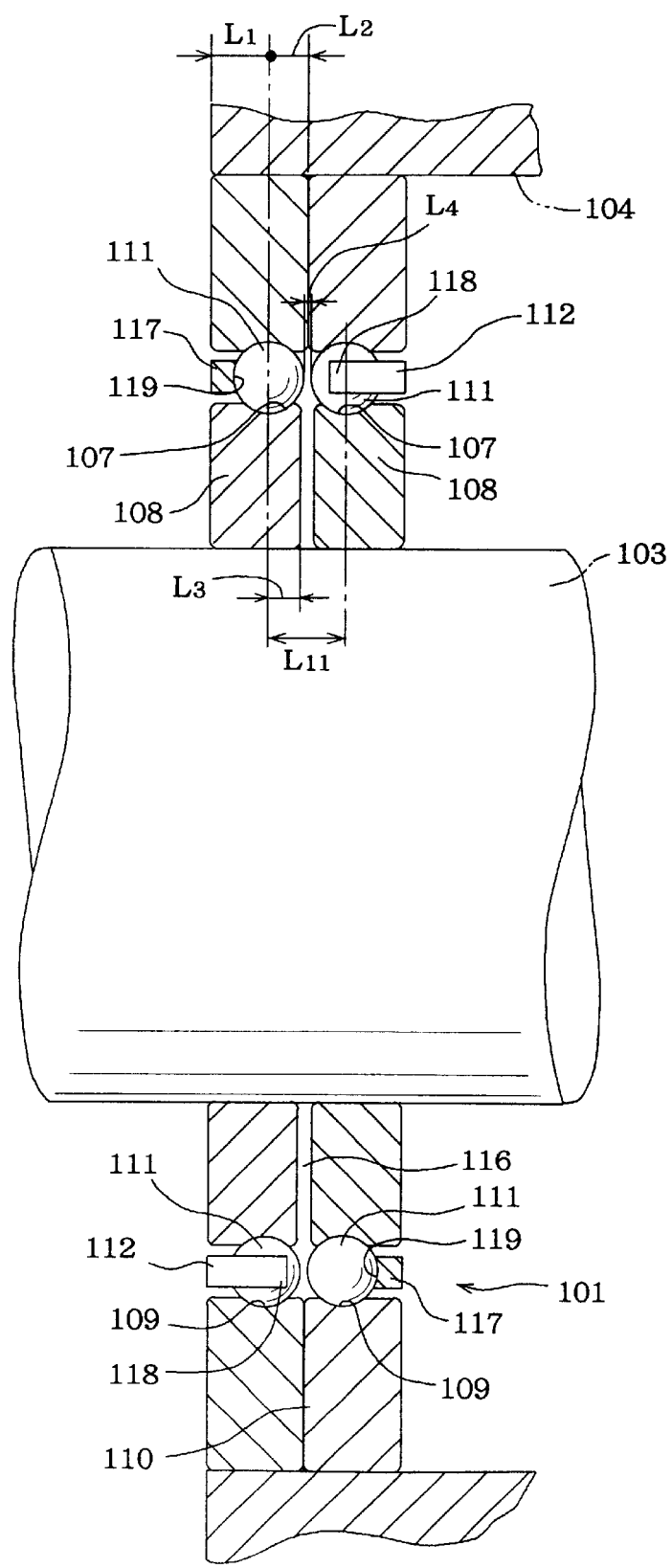
FIG. 15 is a cross sectional view of part of a bearing device according to a fourteenth example of the embodiment of the present invention.
Figure 16:
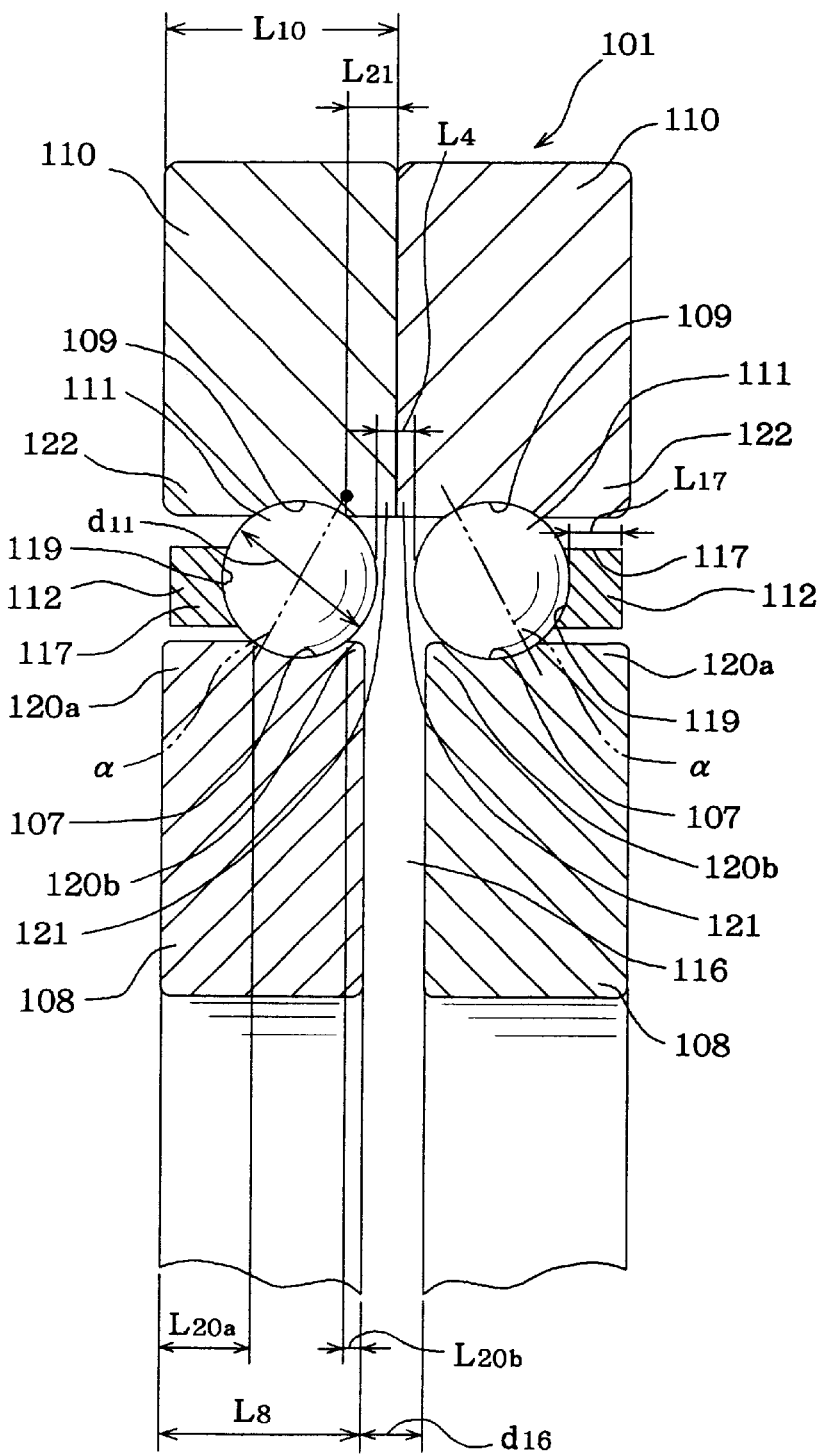
FIG. 16 is a cross sectional view of part of the bearing section according to a fourteenth example of the embodiment of the present invention.

As described above, with this double-row ball bearing, the position of the two rows of balls 31, 32 are displaced in the radial direction of the bearing, and by arranging the first inner ring 4 and second outer ring 7 such that the radially outer section 41 of the inner ring 4 is placed further outside in the radial direction than the radially inner section 73 of the outer ring 7, it is possible to suppress vibration or run-out of the rotating shaft and decrease the width of the double-row ball bearing more than the bearing shown in FIG. 14.

Moreover, with this double-row ball bearing, the radially inner section 42 of the first inner ring 4 and the second inner ring 5 are fitted in the ring-shaped member 12, so it is possible to adjust the pre-load before installation on the shaft 1. In addition, the double-row ball bearing can be delivered already pre-loaded. Also, this double-row ball bearing can be easily installed on the shaft 1.

Figure 11:
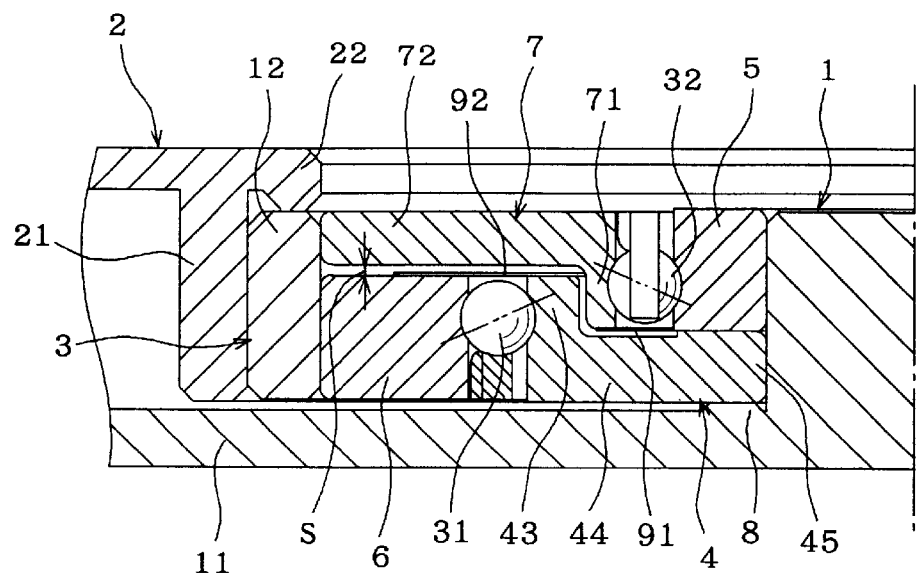
FIG. 11 is a cross sectional view of part of a bearing device according to a eleventh example of the embodiment of the present invention.

FIG. 11 is a cross-sectional drawing showing a double-row ball bearing device of an eleventh example of this invention.

The double-row ball bearing 3 comprises first and second inner rings 4, 5 and first and second outer rings 6, 7, and is set between the shaft 1 and the housing 2 such that it is pre-loaded by a fixed-position pre-loading method.

The two rows of balls 31, 32 of the double-row ball bearing 3 are located such that they are displaced from each other in the radial direction of the bearing. The ball diameter of the balls 31 of one row is the same as that of the balls 32 of the other row. One row (first row) of balls 31 is located further outside in the radial direction of the bearing than the other row (second row) of balls 32. The difference between the diameter of the pitch circle of the first balls 31 and the diameter of the pitch circle of the second balls 32 is approximately 4 times the diameter of the balls 31, 32. The two rows of balls 31, 32 are located such that the distance between the centers of the balls 31, 32 separated in the axial direction is equal to the radius of the balls 31, 32.

The second inner ring 5 has a normal inner ring shape, however, the first inner ring 4 comprises a radially inner section 43 having a raceway, a radially intermediate section 44 that is located at the same position in the radial direction as the position of the second row of balls 32, and a radially inner section 45 that is located such that it faces the inside surface of the second inner ring 5. The first inner ring 4 is formed such that the widths of the radially inner section 45 and radially intermediate section 44 are less than the width of the radially inner section 43. Also, the width of the second inner ring 5 is formed such that it is larger than the width of the radially inner section 45 of the first inner ring 4.

The first outer ring 6 has a normal outer ring shape, however, the second outer ring 7 comprises a radially inner section 71 having a raceway, and a radially outer section 72 on the housing side 2. The second outer ring 7 is formed such that the width of the radially outer section 72 is less than the width of the radially inner section 71, and that the dimension of radially outer section 72 in the radial direction is larger than that of the radially inner section 71.

The radially outer section 72 of the second outer ring 7 and the first outer ring 6 face each other and arranged with a gap S for adjusting the pre-load. The second outer ring 7 and the first outer ring 6 have the same outer diameter, and they are both fitted in the ring-shaped member (gap retaining member) 12. This ring-shaped member 12 fits in the housing 2.

The radially inner section 43 of the first inner ring 4 is located further outside in the radial direction than the radially inner section 71 of the second outer ring 7. A fixed gap for preventing interference is formed between the radially inner section 43 of the inner ring 4 and the radially inner section 71 of the second outer ring 7.

A fixed gap for preventing interference is formed in the axial direction between the radially intermediate section 44 of the first inner ring 4 and the second row of balls 32. Also, there is a seal 90 in this gap between the radially intermediate section and the balls 32. A fixed gap for preventing interference is formed in the axial direction between the radially outer section 72 of the second outer ring 7 and the first row of balls 31. Furthermore, a fixed gap for preventing interference is formed in the axial direction between the radially inner section 71 of the second outer ring 7 and the radially intermediate section 44 of the first inner ring 4.

A seal 91 is located between the radially intermediate section 44 of the first inner ring 4 and the second row of balls 32. The outer edge of this seal 91 is fixed to the side surface of the radially inner section 71 of the second outer ring 7. There is a seal 92 located between the radially outer section 72 of the second outer ring 7 and the first row of balls 31. The outer peripheral edge of this seal 92 is fixed to the side surface of the first outer ring 6.

On one end of the shaft 1 in the lengthwise direction, there is a circular disk-shaped member 11 that is integrated with the shaft 1. On the shaft 1 side of this circular disk-shaped member 11, there is a support member 8 that is formed such that it supports the side surface of the radially inner section 45 of the inner ring 4. Moreover, the housing 2 comprises an outer peripheral member 21 for supporting the outside peripheral surface of the ring-shaped member 12, and a side-surface member 22 for supporting the outside surface of the ring-shaped member 12.

As described above, with this double-row ball bearing, the position of the two rows of balls 31, 32 are displaced in the radial direction of the bearing, and by arranging the first inner ring 4 and second outer ring 7 such that the radially inner section 43 of the inner ring 4 is located further outside in the radial direction than the radially inner section 71 of the outer ring 7, it is possible to suppress vibration or run-out of the rotating shaft and decrease the width of the double-row ball bearing.

Moreover, with this double-row ball bearing, the radially outer section 72 of the second outer ring 7 and the first outer ring 6 press-fit in the ring-shaped member 12, so that it is possible to adjust the pre-load before installation on the housing 2. In addition, the double-row ball bearing can be delivered already pre-loaded. Also, this double-row ball bearing can be easily installed in the housing 2.

Figure 12:
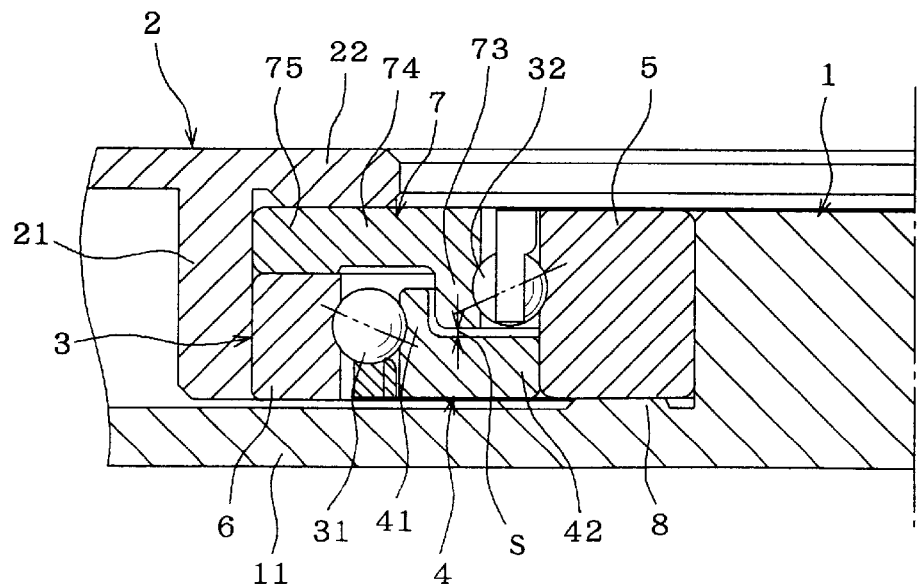
FIG. 12 is a cross sectional view of part of a bearing device according to a twelfth example of the embodiment of the present invention.

FIG. 12 is a cross-sectional drawing showing a double-row ball bearing device of a twelfth example of this invention.

The double-row ball bearing 3 comprises first and second inner rings 4, 5 and first and second outer rings 6, 7, and is set between the shaft 1 and the housing 2 such that it is pre-loaded by a fixed-position pre-loading method.

The two rows of balls 31, 32 of the double-row ball bearing 3 are located such that they are displaced from each other in the radial direction of the bearing. The ball diameter of the balls 31 of one row is the same as that of the balls 32 of the other row. One row (first row) of balls 31 is located further outside in the radial direction of the bearing than the other row (second row) of balls 32. The difference between the diameter of the pitch circle of the first balls 31 and the diameter of the pitch circle of the second balls 32 is approximately 4 times the diameter of the balls 31, 32. The two rows of balls 31, 32 are arranged such that the distance between the centers of the balls 31, 32 separated in the axial direction is equal to the radius of the balls 31, 32.

The first outer ring 6 has a normal outer ring shape, however, the second outer ring 7 comprises a radially inner section 73 having a raceway, a radially intermediate section 74 that is located at the same position in the radial direction as the position of the first row of balls 31, and a radially outer section 75 that is pressed to the side surface of the first outer ring 6. The second outer ring 7 is formed such that the width of the radially outer section 75 is less than the width of the radially inner section 73. Also, the width of the first outer ring 6 is formed such that it is greater than the width of the radially outer section 75 of the second outer ring 7. The first outer ring 6 and the radially outer section 75 of the second outer ring 7 are arranged such that their side surfaces come in contact with each other.

The second inner ring 5 has a normal inner ring shape, however, the first inner ring 4 comprises a radially outer section 41 having a raceway, and a radially inner section 42 on the shaft 1 side. The first inner ring 4 is formed such that the width of the radially inner section 42 is less than the width of the radially outer section 41, and that the dimension of the radially inner section 42 in the radial direction is greater than that of the radially outer section 41.

Moreover, the width of the second inner ring 5 is nearly the same as the length of the shaft 1, and the width of the radially inner section 42 of the first inner ring 4 is about ⅓ the width of the second inner ring 5. The radially inner section 42 of the first inner ring 4 fits around the outer peripheral surface of the second inner ring 5. In other words, the second inner ring 5 also functions as a gap retaining member.

The radially outer section 41 of the first inner ring 4 is arranged such that it is further outside in the radial direction than the radially inner section 73 of the second outer ring 7.

A fixed gap for preventing interference is formed between the radially outer section 41 of the first inner ring 4 and the outer peripheral surface of the radially inner section 73 of the second outer ring 7.

In the axial direction, there is a fixed gap for preventing interference and a gap S for adjusting the pre-load between the radially inner section 42 of the first inner ring 4 and the radially inner section 73 of the second outer ring 7. Also, in the axial direction, there is a fixed gap for preventing interference between the radially inner section 42 of the first inner ring 4 and the second row of balls 32. There is a fixed gap for preventing interference in the axial direction between the intermediate section 74 of the second outer ring 7 and the first row of balls 31. Furthermore, there is a fixed gap for preventing interference in the axial direction between the radially outer section 41 of the first inner ring 4 and the intermediate section 74 of the second outer ring 7.

On one end of the shaft 1 in the lengthwise direction, there is a circular disk-shaped member 11 that is integrated with the shaft 1. On the shaft 1 side of this circular disk-shaped member 11, there is a support member 8 that is formed such that it supports the side surface of the second inner ring 5. The housing 2 comprises an outer peripheral member 21 for supporting the outer peripheral surfaces of the two outer rings 6, 7, and a side-surface member 22 for supporting the outside surface of the second outer ring 7.

As described above, with this double-row ball bearing, the position of the two rows of balls 31, 32 are displaced in the radial direction of the bearing, and by arranging the first inner ring 4 and second outer ring 7 such that the radially outer section 41 of the inner ring 4 is located further outside in the radial direction than the radially inner section 73 of the outer ring 7, it is possible to suppress vibration or run-out of the rotating shaft and decrease the width of the double-row ball bearing more than the bearing shown in FIG. 14.

Moreover, with this double-row ball bearing, the radially inner section 42 of the first inner ring 4 fits around the outer peripheral surface of the second inner ring 5, so it is possible to adjust the pre-load before installation on the shaft 1. In addition, the double-row ball bearing can be delivered already pre-loaded. Also, this double-row ball bearing can be easily installed on the shaft 1.

Furthermore, with this bearing, it is not necessary to have a ring-shaped member 12, such as in the bearing showing in FIG. 10, since the second inner ring 5 also functions as a gap retaining member, and thus it is effective in making it possible to reduce the number of parts.

Figure 13:
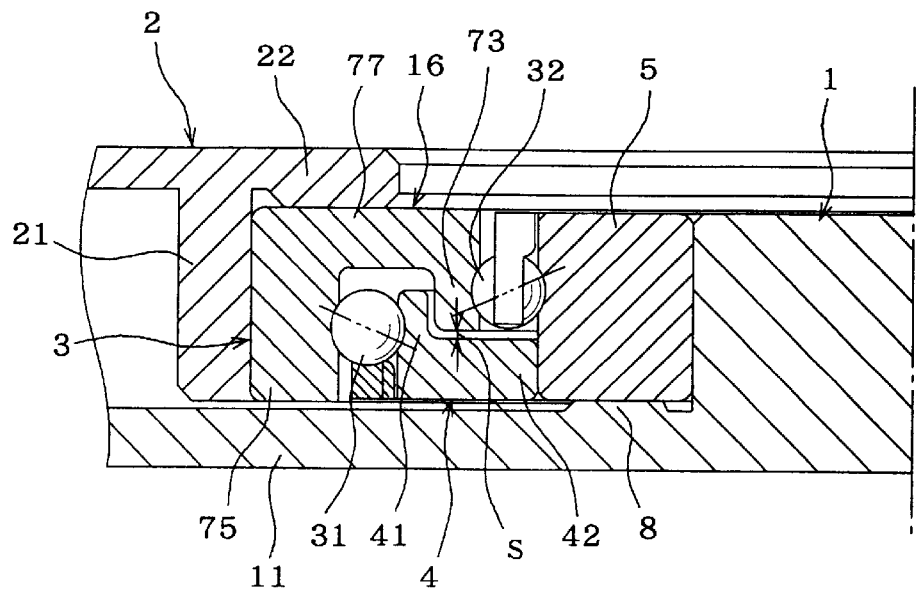
FIG. 13 is a cross sectional view of part of a bearing device according to a thirteenth example of the embodiment of the present invention.

FIG. 13 is a cross-sectional drawing showing a double-row ball bearing device of a thirteenth example of this invention.

The double-row ball bearing 3 comprises first and second inner rings 4, 5 and one outer ring 16, and is set between the shaft 1 and the housing 2 such that it is pre-loaded by a fixed-position pre-loading method.

The two rows of balls 31, 32 of the double-row ball bearing 3 are located such that they are displaced from each other in the radial direction of the bearing. The ball diameter of the balls 31 of one row is the same as that of the balls 32 of the other row. One row (first row) of balls 31 is located further outside in the radial direction of the bearing than the other row (second row) of balls 32. The difference between the diameter of the pitch circle of the first balls 31 and the diameter of the pitch circle of the second balls 32 is approximately 4 times the diameter of the balls 31, 32. The two rows of balls 31, 32 are arranged such that distance between the centers of the balls 31, 32 separated in the axial direction is equal to the radius of the balls 31, 32.

The second inner ring 5 has a normal inner ring shape, however, the first inner ring 4 comprises a radially outer section 41 having a raceway, and a radially inner section 42 on the shaft 1 side. The first inner ring 4 is formed such that the width of the radially inner section 42 is less than the width of the radially outer section 41, and that the dimension of the radially inner section 42 in the radial direction is greater than that of the radially outer section 41.

Moreover, the width of the second inner ring 5 is nearly the same as the length of the shaft 1, and the width of the radially inner section 42 of the first inner ring 4 is about ⅓ the width of the second inner ring 5. The radially inner section 42 of the first inner ring 4 fits around the outer peripheral surface of the second inner ring 5. In other words, the second inner ring 5 also functions as a gap retaining member.

The outer ring 16 is constructed such that the two outer ring 6, 7 shown in FIG. 12 have been integrated, and comprises a radially inner section 73 having a raceway around its inner peripheral surface for the second row of balls 32, a radially intermediate section that is located at the radial position of the first row of balls 31, and a radially outer section 75 having a raceway around its inner surface for the first row of balls 31. The width of the radially outer section 75 of the outer ring 16 is nearly the same as the length of the shaft 1.

The radially outer section 41 of the first inner ring 4 is located further outside in the radial direction than the radially inner section 76 of the outer ring 16. There is a fixed gap for preventing interference formed between the radially outer section 41 of the first inner ring 4 and the outer peripheral surface of the radially inner section 73 of the outer ring 16.

In the axial direction, there is a fixed gap for preventing interference and a gap S for adjusting the pre-load between the radially inner section 42 of the first inner ring 4 and the radially inner section 73 of the outer ring 16. Also, in the axial direction, there is a fixed gap for preventing interference between the radially inner section 42 of the first inner ring 4 and the second row of balls 32. There is a fixed gap for preventing interference in the axial direction between the radially intermediate section 77 of the outer ring 16 and the first row of balls 31. Furthermore, there is a fixed gap for preventing interference in the axial direction between the radially outer section 41 of the first inner ring 4 and the radially intermediate section 77 of the outer ring 16.

On one end of the shaft 1 in the lengthwise direction, there is a circular disk-shaped member 11 that is integrated with the shaft 1. On the shaft 1 side of this circular disk-shaped member 11, there is a support member 8 that is formed such that it supports the side surface of the second inner ring 5. The housing 2 comprises an outer peripheral member 21 for supporting the outer peripheral surface of the outer ring 16, and a side-surface member 22 for supporting the outside surface of the outer ring 16.

As described above, with this double-row ball bearing, the position of the two rows of balls 31, 32 are displaced in the radial direction of the bearing, and by placing the radially outer section 41 of the first inner ring 4 further outside in the radial direction than the radially inner section 76 of the outer ring 16, it is possible to suppress vibration or run-out of the rotating shaft and decrease the width of the double-row ball bearing more than the bearing shown in FIG. 14.

Moreover, with this double-row ball bearing, the radially inner section 42 of the first inner ring 4 fits around the outer peripheral surface of the second inner ring 5, so it is possible to adjust the pre-load before installation on the shaft 1. In addition, the double-row ball bearing can be delivered already pre-loaded. Also, this double-row ball bearing can be easily installed on the shaft 1.

Furthermore, with this bearing, it is not necessary to have a ring-shaped member 12, such as in the bearing showing in FIG. 10, since the second inner ring 5 also functions as a gap retaining member, and the two outer ring 6, 7 shown in FIG. 12 are integrated into one outer ring 17, in which raceways for both rows of balls are formed. Therefore it is effective in making it possible to reduce the number of parts comparing with the structure in FIG. 12.

FIG. 14 is a cross-sectional drawing showing a double-row ball bearing device of a comparative example of this invention.

The double-row ball bearing comprises first and second inner rings 4, 5 and first and second outer rings 6, 7, and it set between the shaft 1 and housing 2 such that it is pre-loaded by a fixed-position pre-loading method.

The two inner rings 4, 5 are formed such that they have the same width, and that the width is fixed in the radial direction. The two outer rings 6, 7 are formed such that they have the same width, and that the width is fixed in the radial direction. The two rows of balls 31, 32 are formed such that the ball diameter of the balls 31 of one row is the same as the diameter of the balls 32 of the other row, and they are arranged at the same position in the radial direction.

The first inner ring 4 and the second inner ring 5 face each other in the axial direction with a gap S for adjusting the pre-load. The inner diameter of the first inner ring 4 is the same as that of the second inner ring 5, and they both fit in a ring-shaped member (gap retaining member) 12. The ring-shaped member 12 fits over the shaft 1.

In another feature of the present invention, a bearing device comprises a pair of outer races each having an inner peripheral surface on which an outer ring raceway is formed (an outer race can have a pair of outer ring raceways), a pair of inner races each having an outer peripheral surface on which an inner ring raceway is formed, a plurality of balls rollably provided between the outer ring raceway and the inner ring raceway, a retainer provided between the inner peripheral surface of the respective outer races and the outer peripheral surface of the respective inner races to rollably hold the balls, the pair of outer races having axial end surfaces opposing each other, the pair of inner races having axial end surfaces opposing each other, the pair of outer races fitted into and fixed to an outer member with the axial end surfaces thereof abutted to each other, and the pair of inner races fitted into and fixed to an inner member in the state where a desired preload is applied to the balls by pushing the pair of inner races with a gap between the axial end surfaces thereof to come closer to each other, wherein the axial center of the outer ring raceways is biased toward the side of the abutment of the outer races in the axial direction of the outer races, and wherein the retainer is of the crown type and comprises an annular main portion and a plurality of resilient portions provided on one axial side of the main portion such that a pocket is formed between a pair of circumferentially adjacent resilient portions, and wherein the main portion is provided closer to either axial end of the bearing device and wherein the outer races and inner races have an axial end surface on either axial side of the bearing device, such that the axial end surfaces of the outer races and inner races are placed at substantially the same location in the axial direction.

FIG. 15 to FIG. 18 show a fourteenth example of the present invention, wherein the bearing device 101 has a pair of outer rings 110 which have an inner peripheral surface on which the outer ring raceway 109 is formed, and can be fitted into the outer member or hub 104, a pair of inner rings 108 which have an outer peripheral surface on which the inner ring raceway 107 is formed, and can be fitted onto the inner member or support shaft 103, a plurality of balls rotatably provided between the inner ring raceways 107 and the outer ring raceways 109, respectively, and a pair of retainers 112 provided between the inner peripheral surface of the outer rings 110 and the outer peripheral surface of the inner rings 108 to rotatably support the balls, respectively. When using the bearing device 101, the axially inner end surfaces of the pair of the outer rings 110 are abutted to each other, and in this state, the pair of the outer rings 110 are fitted into and fixed to the hub 104 by way of interference fitting or adhesion etc.

In the present specification, the term "axially inner" means the sides in which the outer rings 110 and the inner rings 108 face each other in the axial direction, while the term "axially outer" means the sides in which the outer rings 110 and the inner rings 108 do not face each other in the axial direction.

In addition, the axially inner end surfaces of the pair of the inner rings 108 are provided with a gap 116 therebetween, and in this state, a tool (not shown) is used in order that the pair of the inner rings 108 are pushed so as to come closer each other to apply a desired pre-load to the balls 111, and in this state, the pair of inner rings 108 are fitted onto and fixed to the support shaft 103 by way of interference fitting or adhesion etc.

In the case of the present example, the diameter $d_{11}$ (FIG. 16) of the balls is 0.5 mm.

In the case of the present invention, the retainers 112 are of a crown type and comprise an annular main portion 117 and a plurality of resilient portions 118 provided on one of the axial surfaces, such that a pocket is formed between a pair of circumferentially adjacent resilient portions. In the present example, the retainers 112 are made of a synthetic resin such as polyamide 66.

In the case of the present invention, the axial center of the outer ring raceways 109 is biased to the side of abutment between the outer rings 110 with respect to the axial direction of the outer rings 110. Accordingly, provided that $L_1$ represents the axial length between the axial center of the outer ring raceways 109 and the axially outer end surface of the outer rings 110, and that $L_2$ (FIG. 16) represents the axial length between the axial center of the outer ring raceways 109 and the axially inner end surface of the outer rings 110, $L_1$ is larger than $L_2$ ($L_1 > L_2$). In addition, provided that $L_3$ represents the axial length between the axially inner end surface of the inner rings 108 and the axial center of the inner ring raceways 107 on the outer peripheral surface of the inner rings 108, and $L_2$ represents the axial length between the axially inner end surface of the outer ring 110 around the inner ring 108 and the axial center of the outer ring raceway 109 on the inner peripheral surface of the outer rings 110, $L_3$ is smaller than $L_2$ ($L_3 < L_2$).

In the case of the present invention, the main portions 117 of the retainers 112 are located closer to the axial opposite ends of the bearing device 101. And, the axially outer end surface of the outer rings 110 is provided at substantially the same position as the axially outer end surface of the inner rings 108. The term "at substantially the same position" means that the axial displacement is less than the sum of the displacement due to the predetermined pre-load on the balls 111 and the tolerance in size required in process, and in this example, it is up to 0.25 mm.

The end surface of the main portions 117 of the retainers 112 does not project in the axially outer side than the outer end surface of the outer and inner rings 110, 108 when the respective members are located at the median in the range of size tolerance, but may slightly project depending on the produced condition. In addition, with the present example, part of the balls 111 is axially slightly projected to the side of the gap 116 than the inner end surface of the inner rings 108.

With the bearing device constructed as mentioned above, a predetermined pre-load is applied to the balls 111 to sufficiently secure the bearing rigidity, while the whole axial length can be made sufficiently small. The following are reasons for it.

First, as to the first reason, with the present invention, the axial center of the outer ring raceways 109 is biased to the side of the abutment between the outer rings 110 with respect to the axial direction of the outer rings 110.

The axial length $L_3$ between the axially inner end surface of the inner rings 108 and the axial center of the inner ring raceways 107 on the outer peripheral surface of the inner rings 108 is smaller than the axial length $L_2$ between the axially inner end surface of the outer ring 110 around the inner ring 108 and the axial center of the outer ring raceways 109 on the inner peripheral surface of the outer rings 110 ($L_3 < L_2$).

Figure 19:
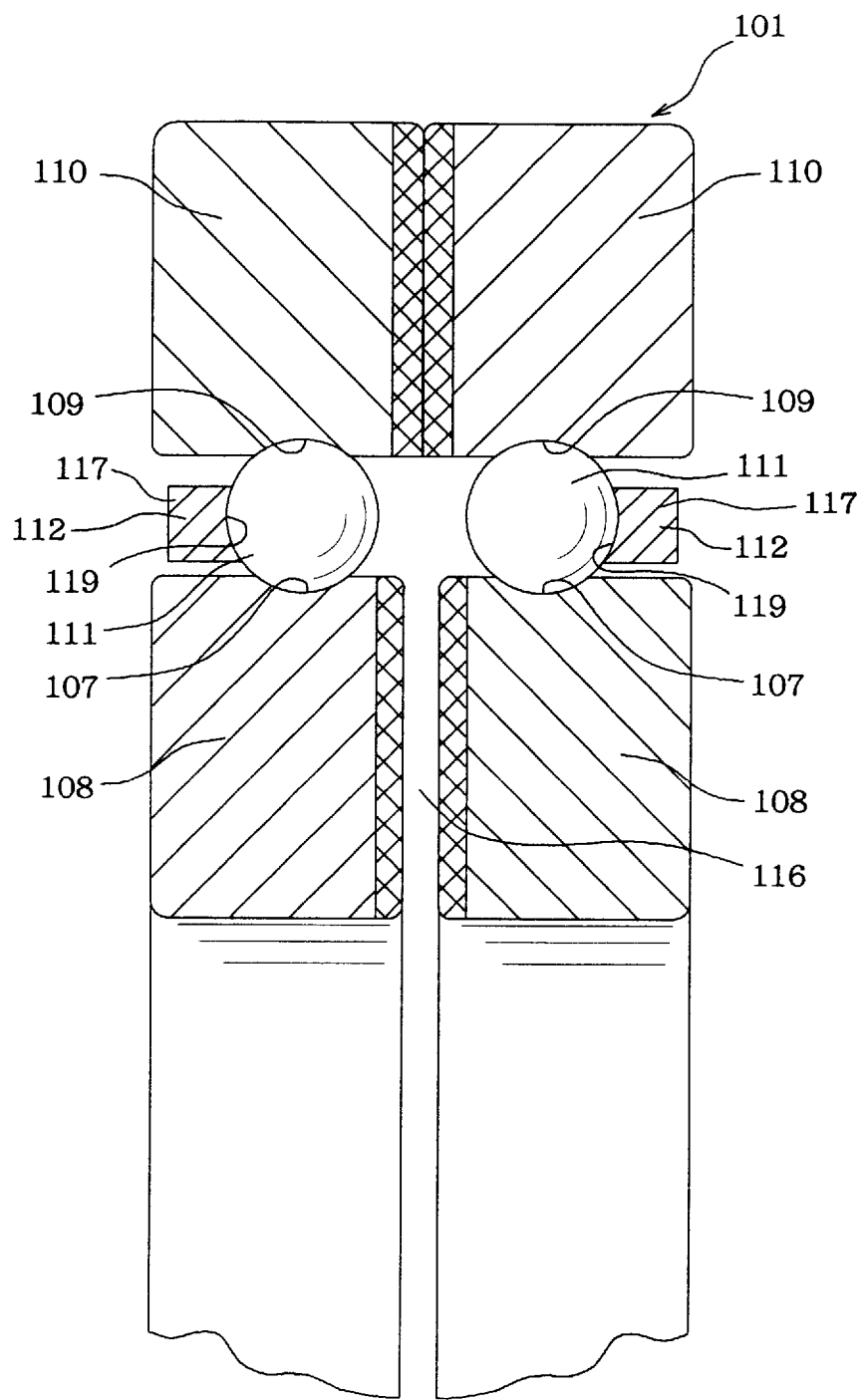
FIG. 19 is a cross sectional view corresponding to FIG. 16.

On the other hand, with the conventional structure as shown in JP Patent Publication Toku Kai Hei 10-159843, the axial center of the outer ring raceways is biased to the side opposite to the abutment between the outer rings with respect to the axial direction of the outer rings. And, as in the bearing unit 101 shown in FIG. 19 for comparison, the axial center of the outer ring raceways 109 is located at the same position to the axial center of the outer rings 110, and in this case, although the whole length in the axial direction can be made shorter in a degree comparing with the conventional structure, it could not be said that it is sufficiently small. Specifically, in the structure of FIG. 19, the inner end portions of the inner and outer rings 108, 110, as shown by tilted lattice hatchings, at the axially inner end portions of the inner and outer rings 108, 110 can still be cut away.

Taking these points into consideration, the axial center of the outer ring raceways 109 is axially vised to the side of the abutment between the outer rings 110, and the axial length $L_3$ is smaller than the axial length $L_2$, ($L_3 < L_2$), as mentioned above. Consequently, the axial length between the outer rings 110 and the axially inner end of the inner rings 108 can be made small by the amount of the axial length as illustrated by the tilted lattice hatchings in FIG. 19. Therefore, with the present invention, the axial length of the axially inner end of the outer and inner rings 110, 108 to make the whole length of the bearing device 101 shorter.

Next, as to the second reason, the retainers 112 are of the crown type and comprise an annular main portion 117 and a plurality of resilient portions 118 provided on one axial surface of the main portions 117, such that a pocket 119 is formed between a pair of circumferentially adjacent resilient portions 118. In addition, the main portions 117 are provided closer to the axial opposite ends of the bearing device 101.

Figure 20:
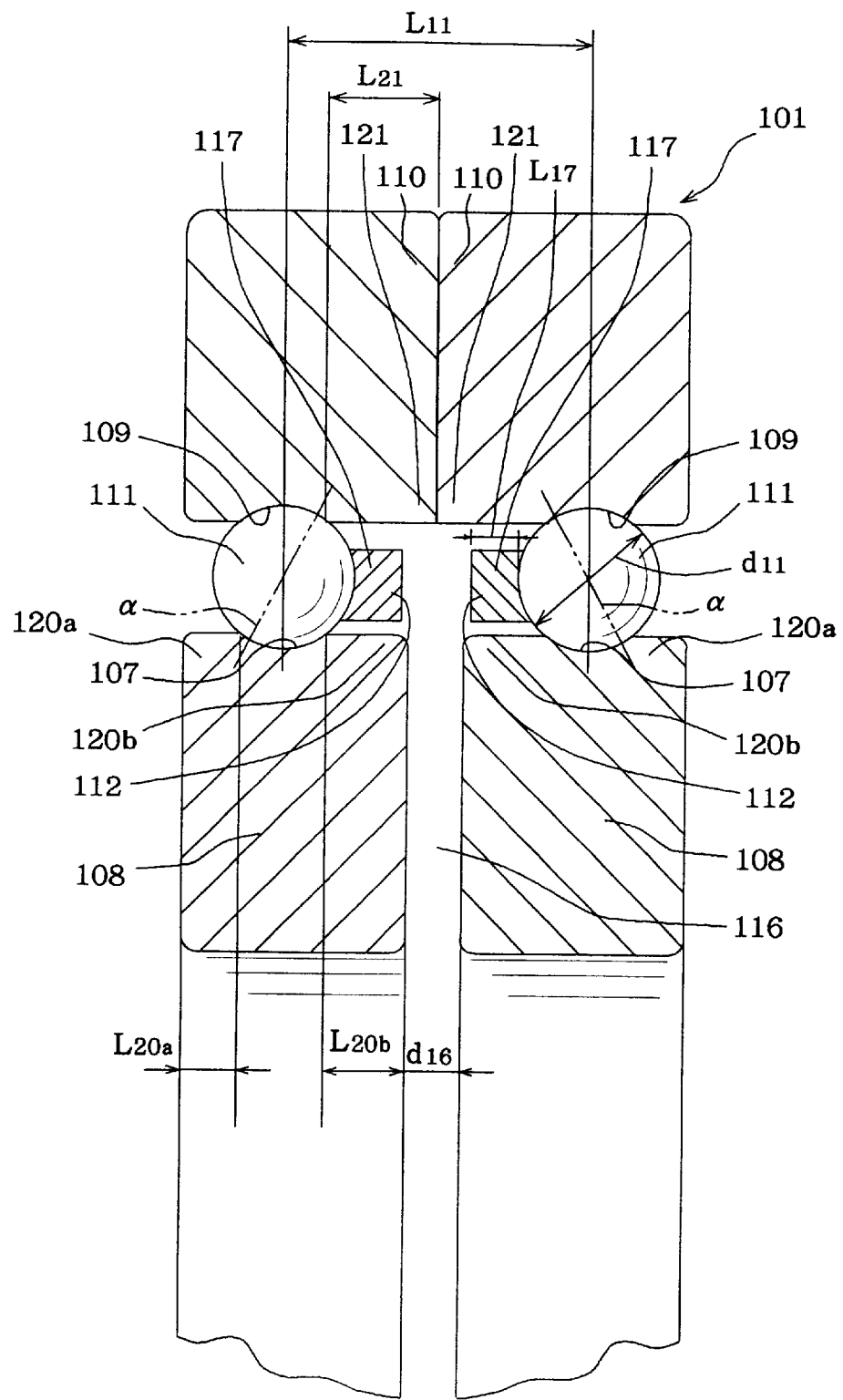
FIG. 20 is a cross sectional view of a comparative example corresponding to FIG. 16.

On the other hand, as in a second comparative example shown in FIG. 20, when the main portions 117 of the retainers 112 are provided closer to the axial center of the bearing device, the whole length can not be made sufficiently shorter. This is because the material thickness $L_{17}$ of the main portions 117 in the axial direction must be made larger in a degree so as to secure the rigidity of the retainers 112. This can be similarly true to the small sized bearing device to which the present invention is applied. And, as to the shoulder portions 120a, 120b provided on the axially opposite sides on the outer peripheral surface of the inner rings 108, the necessary minimum of the minimum material thickness of the main portions 117 is larger than the necessary minimum of the axial length $L_{20b}$ of the shoulder portions 120b on the radially inner side of the main portions 117.

Incidentally, the axial length of the shoulder portions 120a, 120b is necessary to secure the strength of the shoulder portions 120a, 120b. Accordingly, with the structure of FIG. 20, the axial length $L_{11}$ between a pair of the rows of the balls 111 is large based on the existence of the main portions 117.

Specifically, in the structure shown in FIG. 20, a desired pre-load is applied to the balls 111 by pushing the pair of inner rings 108 such that they come closer to each other and fitted into and fixed to the support shaft 103 (FIG. 15), and in this state, based on the change of the internal gap in the components, a load is applied to the outer rings 110 and the inner rings 108 from the balls 111 in the direction as shown bu the dotted lines α in FIG. 20.

Accordingly, with the pair of shoulder portions 120a, 120b provided axially both sides of the outer peripheral surface of the inner rings 108, the shoulder portions 120b on the axially outer side to which the load is applied from the balls 111 is close to the operating point of this load. Therefore, their strength is insufficient comparing with the strength of the shoulder portions 120b in the axially inside. Accordingly, the axial length $L_{20a}$ of the shoulder portions 120a on the axially outside must be sufficiently large to secure the strength.

On the other hand, the shoulder portions 120b on the axially inside are not subject to the load from the balls 111, and therefore there is no particular need that the axial length $L_{20b}$ is large. However, even if the axial length $L_{20b}$ of the shoulder portions 120b is short without changing the structure of FIG. 20, the axial length $L_{11}$ between the pair of rows of the balls 111 could not be small, and it is impossible to make the bearing device 101 small.

On the other hand, in the present invention, the main portions 117 of the retainers 112 are located closer to the both axial ends of the bearing device 101. Accordingly, by eliminating the main portions 117 from between the pair of rows of the balls 111, the axial length $L_{11}$ (FIG. 15) between the pair of rows of the balls can be made shorter than the axial length $L_{11}$ shown in FIG. 20.

In the present invention, the main portions 117 are located closer to the both ends of the bearing device in the axial direction, and so the axial length of the axially outer portion than the balls 111 is longer than the axial length of the axially inner portion. Specifically, when the main portions 117 are located closer to the both axial ends of the bearing device 101, the axial length ($L_{17}+d_{11}/2$) between the axial end surfaces of the main portions 117 and the center of the balls 111 could not be made smaller comparing with the case where the main portions 117 are located closer to the axial center of the bearing device 101.

Supposed that the inner rings 108 are moved closer to each other for preloading, when the main portions 117 are located closer to the both axial ends of the bearing device 101, the size $d_{16}$ of the gap 116 between the axial end surfaces of the inner rings 108 or retainers 112 could not be made smaller comparing with the case where the main portions 117 are located closer to the axial center of the bearing device 101.

On the other hand, the axial length between the axial end surface of the inner ring 108 on the side where the main portions 117 are not provided, and the center of the balls 111 is changed depending on the axial length $L_{20a}$ (or $L_{20b}$) required to secure the strength of the shoulder portion 120a (or 120b) of the inner rings 108 located in that portion.

When looking at the drawings taking these points into consideration, it is found that in the structure shown in FIG. 20, a load from the balls 111 under preload is applied to the axially outer shoulder portion 120a of the inner rings 108 on the side where the main portions 117 are not provided. Therefore, in spite that the main portions 117 are not provided, the axial length $L_{20a}$ of the shoulder portion 120a on the axially outer side must be made larger. This leads to the increase in size of the bearing device because the axial length on the inner and outer sides of the balls 111 must be made larger.

On the other hand, in the present invention, a load from the balls 111 under preload is not applied to the axially inner shoulder portion 120b of the inner rings 108 on the side where the main portions 117 are not provided. Accordingly, in the present invention, it is not necessarily taken into consideration to prevent any interference of the main portions 117, and therefore the axial length $L_{20b}$ of the shoulder portions 120b on the axially inner side of the inner rings 108 can be made smaller than the axial length $L_{20a}$ of the shoulder portions 120a on the axially outer side of the inner rings 108 as shown in FIG. 20. That is $L_{20b}<L_{20a}$.

In addition, in the present embodiment, the axially outer end surface of the outer rings 110 is located at the substantially same position in the axial direction as the axially outer end surface of the inner rings 108. And, the main portions 117 are arranged around the shoulder portion 120a having the axial size enlarged for larger strength, and so the respective end surfaces can be located at the substantially same position as the axially outer end surface of the outer rings 110 and inner rings 108. As a result, in the present embodiment, the whole axial length of the bearing device 101 can be made smaller by the amount equal to the length twice the difference $\delta(=L_{20a}-L_{20b})$ between the axial length $L_{20b}$ of the shoulder portions 120b on the axially inner side of the inner rings 108 and the shoulder portion 120a on the axially outer side of the inner rings 108 in the structure as shown in FIG. 20.

In the present embodiment, the axial length $L_{21}$ of the shoulder portions 121 on the axially inner side of the outer rings 110 under the load from the balls 111 due to preloading can be made smaller than the axial length $L_{21}$ of the shoulder portions 121 on the axially inner side of the outer rings 110 as shown in FIG. 20. That is $L_{21}<L_{11}$.

However, in the present embodiment, the inner end surfaces of the shoulder portions 121 are abutted to each other. Accordingly, the axial length $L_{21}$ of the shoulder portions 121 is equal to the sum of the axial length $L_{20b}$ of the shoulder portions 120b on the axially inner side of the inner rings 108 and the a half ($d_{16}/2$) of the gap 116. That is $L_{21}=L_{20b}+d_{16}/2$. It is securely longer than the axial length $L_{20a}$ of the shoulder portion 120a of the inner rings 108 shown in FIG. 20. In addition, the loads from the balls 111 to the shoulder portions 121 are offset each other because they are exerted in the direction to push the shoulder portions 121 each other. Consequently, the strength of the shoulder portions 121 is never insufficient.

Consequently, according to the present embodiment of the invention, the whole axial length of the bearing device can be sufficiently short for miniaturizing and light weighting. Therefore, even if there are large differences in linear expansion coefficient between the materials for the hub 104, support shaft 103, outer rings 110 and inner rings 108, and even if there are differences in temperature between the outer rings 110 and the inner rings 108 during use, deformation caused due to the differences in thermal expansion amount in the fitting fixing portions of the members 104, 103, 110, 108 can be made small. Consequently, the amount of change in the bearing rigidity can be very small.

In the present embodiment, with the main portions 117 of the retainers 112, the minimum material thickness $L_{17}$ of the portion corresponding to the pockets 119 is larger than 0.1 mm and less than 0.2 mm. The control to this range of the minimum material thickness $L_{17}$ is to sufficiently secure the durability and to make the whole axial length of the bearing device sufficiently short. Specifically, if the minimum material thickness $L_{17}$ of the main portions 117 is 0.2 mm or more, it is difficult to make the whole axial length comparing with the conventional compact bearing device, while if the minimum material thickness $L_{17}$ of the main portions 117 is 0.1 mm or less, it is difficult to sufficiently secure the rigidity of the retainers 112. For example, when the minimum material thickness $L_{17}$ is 0.1 mm, and when the inner and outer rings 108, 110 are relatively rotated at the speed of 5000 rpm, the retainers 112 could not bear the centrifugal force thereon, and part of them could be deformed. Therefore, when the minimum material thickness $L_{17}$ is 0.1 mm, the rotation speed during use must be controlled less than 5000 rpm.

Incidentally, the ratio of the minimum material thickness $L_{17}$ to the diameter $d_{11}$ of the balls 111 is in the range of 0.2 to 0.4. That is, $0.2<L_{17}/d_{11}<0.4$.

Moreover, in the present embodiment, part of the balls held in the retainer 112 is slightly axially projected than the inner end surface of the inner rings 108 toward the gap 116. Therefore, the axial length $L_4$ between the balls 111 can be small, and so the whole axial length of the bearing device 101 can be further small.

Incidentally generally speaking, in the bearing device where a pair of ball bearings are combined with each other and the balls of the bearings are preloaded for use, the load applied to the outer rings and to the inner rings from the balls is tilted indirection with reference to the central axis of the bearing device. Accordingly, a pair of shoulder portions are provided on the axially opposite sides of the inner peripheral surface of the outer ring and of the outer peripheral surface of the inner ring, such that they are different from each other in diameter. And, even if the balls are pushed to one of the shoulder portions, the balls are prevented from riding on the shoulder portion.

On the other hand, in the present embodiment, a pair of the shoulder portions 120a, 120b, 121, 122 are provided on the axially opposite sides of the inner peripheral surface of the outer rings 110 and of the outer peripheral surface of the inner rings 108, such that they have substantially the same diameter. This is because the present embodiment is applied to the extremely small bearing device being e.g. 2 mm in inner diameter and 9 mm in outer diameter, where the process for manufacturing the bearing device is difficult if the shoulder portions 120a, 120b, 121, 122 are different from each other in diameter. With the extremely small bearing device 101, since the load based on the preload on the balls 111 is comparatively small, the balls 111 never ride on the shoulder portions 120a, 121 on the preload side even if the shoulder portions 120a, 120b, 121, 122 in the outer and inner rings 110, 108 have the same diameter.

In the present embodiment, the ratio of the diameter d11 of the balls 111 to the axial length $L_8$ of the inner rings 108 is 0.71 and the ratio of the diameter $d_{11}$ of the balls 111 to the axial length $L_{10}$ of the outer rings 110 is 0.65. Therefore, $d_{11}/L_8 \geq 0.6$, and $d_{11}/L_{10} \geq 0.6$. This is substantially larger than in the case of the conventional bearing device where the crown type retainer is installed with the balls having a diameter up to 0.5 mm. This is because, in the present embodiment, the whole axial length of the bearing device 101 can be sufficiently small even when the diameter $d_{11}$ of the balls 111 is set at a fixed value.

With the present embodiment, the bearing device can be miniaturized and lightweighted while securing sufficient bearing rigidity under preload. For example, the main portions 117 of the retainers 112 are made to have a minimum material thickness $L_{17}$ as small as possible while keeping the durability of the retainers 112, and so the axial length of the bearing device 101 can be small, specifically 1.6 mm or less.

Incidentally, when implementing this embodiment, the outer ring is not necessarily divided in two pieces. A single piece of outer ring having a double row of outer ring raceways on its inner peripheral surface can be used so long as inconvenience more or less caused in manufacturing and assembling is accepted.

In another feature of the present invention, a bearing device comprises a pair of outer races each having an inner peripheral surface on which an outer ring raceway is formed (an outer ring can have two raceways), a pair of inner races each having an outer peripheral surface on which an inner ring raceway is formed, a plurality of balls rotatably provided between the outer ring raceway and the inner ring raceway, a cylindrical sleeve provided on the radially inside of the pair of inner rings, the pair of outer races having an axial end surface, respectively, such that the axial end surfaces are opposed to each other, the pair of inner races having an axial end surface, respectively, such that the axial end surfaces are opposed to each other, the axial end surfaces of the outer races abutted to each other, the pair of inner races fitted onto and fixed to the sleeve in the state where a desired preload is applied to the balls by pushing the pair of inner races with a gap between the axial end surfaces thereof to come closer to each other.

Figure 17:
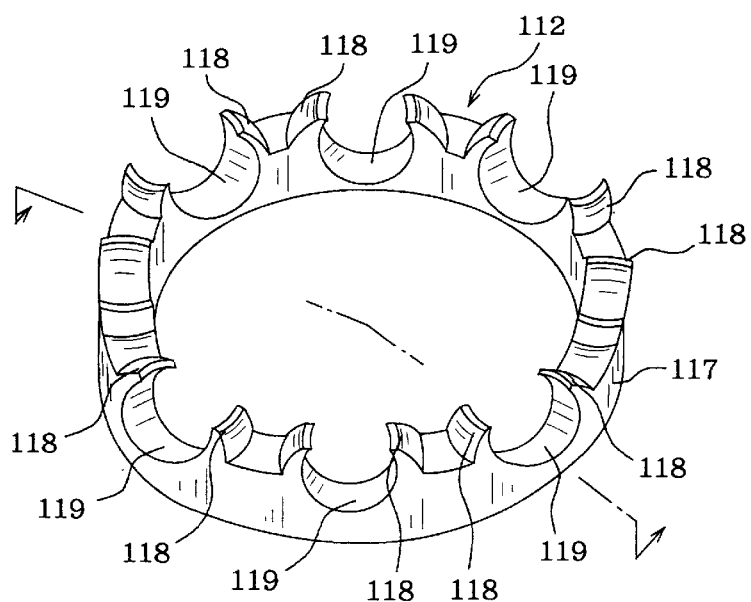
FIG. 17 is a perspective view of the retainer used in the bearing device according to the fourteenth example of the embodiment of the present invention.
Figure 18:
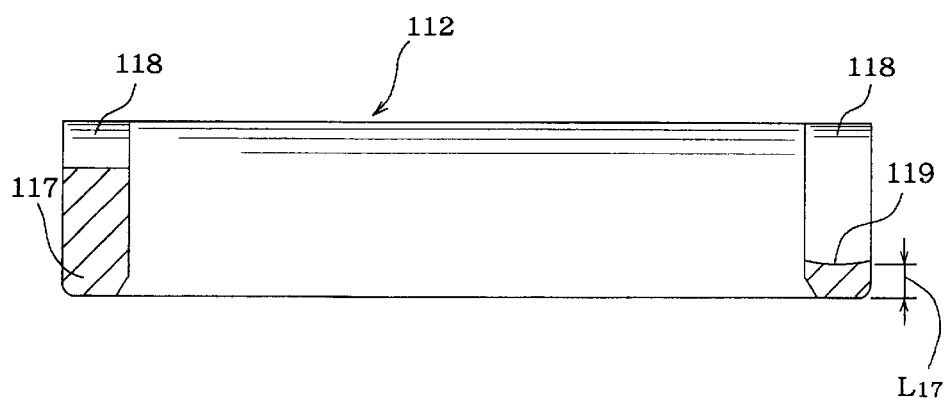
FIG. 18 is a cross sectional view of a retainer of FIG. 17.
Figure 21:
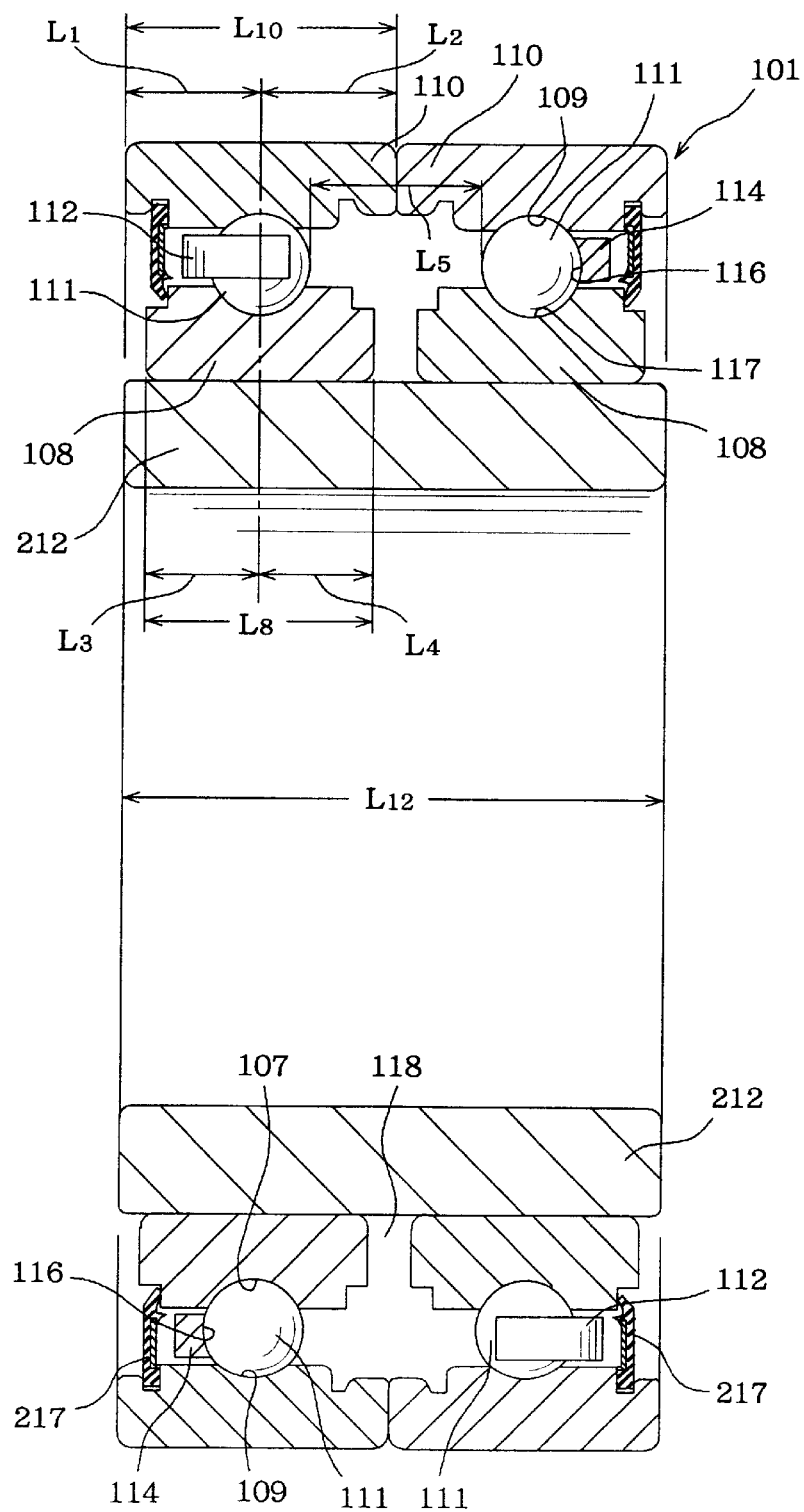
FIG. 21 is a cross sectional view of part of a bearing device according to a fifteenth example of the embodiment of the present invention.

FIG. 21 shows a fifteenth example of the embodiment of the present invention, wherein the bearing device 101 has a pair of outer rings 110 which have an inner peripheral surface on which the outer ring raceway 109 is formed, and can be fitted into the outer member or hub 104 with interference fit or adhesion, a pair of inner rings 108 which have an outer peripheral surface on which the inner ring raceway 107 is formed, a plurality of balls 111 rotatably provided between the inner ring raceways 107 and the outer ring raceways 109, respectively, and a cylindrical sleeve 212 fitted onto and fixed by the inner member or support shaft (not shown) by way of interference fit with a slight interference. FIGS. 17 and 18 can be referred to for reference in this example which has a similar structure. The inner and outer peripheral surfaces of the sleeve 212 are formed in a simple cylindrical shape. And, the axial length $L_8$ of the inner rings 108 is smaller than the axial length $L_{10}$ of the outer rings 110. That is, $L_8 < L_{10}$.

The axial center of the outer ring raceways 109 and the inner ring raceways 107 are provided at the central location in the axial direction of the outer rings 110 and inner rings 108. Specifically, the axial length $L_1$ between the axial center of the outer ring raceways 109 and the axially outer end surface of the outer rings 110 is the same to the axial length $L_2$ between the axial center of the outer ring raceways 109 and the axially inner end surface of the outer rings 110. That is, $L_1=L_2$. And, the axial length $L_3$ between the axial center of the inner ring raceways 107 and the axially outer end surface of the inner rings 108 is the same to the axial length $L_4$ between the axial center of the inner ring raceways 107 and the axially inner end surface of the inner rings 108. That is, $L_3=L_4$.

Accordingly, the axial length $L_4$ between the axial center of the inner ring raceways 107 and the axially inner end surface of the inner rings 108 is smaller than the axial length $L_2$ between the axial center of the outer ring raceways 109 and the axially inner end surface of the outer rings 110. That is, $L_4 < L_2$. And, the axial length $L_{12}$ of the sleeve 212 is about twice the axial length $L_{10}$ of the pair of outer rings 110. That is, $L_{12} \approx 2L_{10}$.

A pair of retainers 112 are provided between the inner peripheral surface of the outer rings 110 and the outer peripheral surface of the inner rings 108 to rotatably hold the balls 111. The retainers 112 is of the crown type and are made of a synthetic resin such as polyamide 66 and formed as in the fourteenth example. The main portions 117 are located closer to the axially opposite ends of the bearing device. And, seal rings 217 are provided between the inner peripheral surface of the outer end of the outer rings 110 and the outer peripheral surface of the outer end of the inner rings 108 to block the both axial ends of the space where the balls 111 are arranged.

The axially opposite inner end surfaces of the pair of outer rings 110 are abutted to each other, and in this state, the pair of inner rings 108 are pushed to come close to each other while a gap 116 exists between the axial inner end surfaces, whereby the inner rings 108 are fitted onto and fixed to the sleeve 212 by way of interference fit or adhesion with the balls 111 under the desired preload.

The inner rings 108 are fitted onto the sleeve 212 for fixing by the bearing device manufacturer using a special apparatus, as for the conventional structures, which includes a measurement device for natural frequency and a device for ultraviolet ray radiation.

In the state where the inner rings 108 are fitted onto the sleeve 212 for fixing, the axially outer end surface of the outer rings 110, at the location of the axially opposite ends of the bearing device, is provided at substantially the same position as the axially outer end surface of the sleeve 212.

The term "at substantially the same position" means that the axial displacement is less than the tolerance in size required for processing.

The bearing device 101 of the present embodiment of the invention can be easily installed on the support shaft 3 at a manufacturer having no special apparatus to apply a desired preload. Specifically, the bearing device 101 of the present embodiment of the invention can be provided with a desired preload at a bearing manufacturer having a special apparatus. In this state, the support shaft 3 having various parts around it is not mounted to the bearing device 101. And, the bearing device 101 is sent from the bearing manufacturer to a manufacturer of article in order that the bearing device 101 is installed in the article. At this manufacturer of article, the sleeve 212 of the bearing device 101 is fitted for fixing to the support shaft 103 by way of interference fit with slight interference. The process of such fitting can be made without a special apparatus for preloading. Accordingly, the bearing device 101 of the present invention can be easily mounted to the support shaft 103 by the article manufacturer having no special apparatus for preloading. Consequently, with the present invention, the operation of transporting for manufacturing the article with the bearing device therein can be lightened, and the cost of the article having the bearing device 101 therein can be decreased. In addition, the same bearing device 101 can be mounted to various apparatus, and therefore mass production for the bearing device is possible, which leads to the cost reduction of the bearing device 101.

Incidentally, when the sleeve 212 is fitted onto the support shaft 103 for fixing at the article manufacturer, the interference of the sleeve with respect to the support shaft 103 is slight in order not to change the desired preload previously applied to the bearing device 101.

In the present example, the axial center of the inner ring raceways 107 and the axial center of the outer ring raceways 109 are located at the center in the axial direction of the inner and outer rings 108, 110. Accordingly, in the present example, when the inner and outer rings 108, 110 are set to the processing apparatus where the inner ring raceways 107 and the outer ring raceways 109 etc. are subjected to the polishing or super finishing after the inner rings 108 and outer rings 110 are subjected to heat treatment, the inconvenient step to control the direction of the inner rings 108 or outer rings 110 for adjustment in location of the inner ring raceways 107 and outer ring raceways 109 can be removed.

In the case of the present invention, the sleeve 212 is fitted for fixing to the support shaft 103 with slight interference, but it is possible to fix the sleeve 212 to the support shaft 103 by way of clearance fitting and adhesive on the support shaft 103.

It is desirable that when the sleeve 212 is fixed with adhesive to the support shaft 103, the sleeve 212 and the support shaft 103 are kept in a horizontal attitude and under the pushing force for preloading, so that the adhesive is naturally solidified. This is because if the sleeve 212 is fixed to the support shaft 103 by keeping the state where the sleeve 212 and support shaft 103 are arranged such that they are tilted with reference to the vertical direction or horizontal direction, until the adhesive is naturally solidified, any inconvenient process would be required to temporality fix the sleeve 212 with a tool to the support shaft 103 so as to prevent the sleeve 212 from moving in the direction so that sleeve 21 comes off from the support shaft 103. When the adhesive is naturally solidified, any special device for ultra-violet ray radiation for instant solidification is not need for use.

Incidentally, in the example illustrated, the axial outer end surface of the outer rings 110 is located substantially at the same axial direction to the axial end surface of the sleeve 212. On the other hand, if the axial end surface of the sleeve 212 is located at a location slightly inset from the axial outer end surface of the outer rings 110, the possibility of troubles such that the end surface of the sleeve 212 is bumped during transportation of the bearing device 101 to change the set preload load would be decreased.

Figure 22:
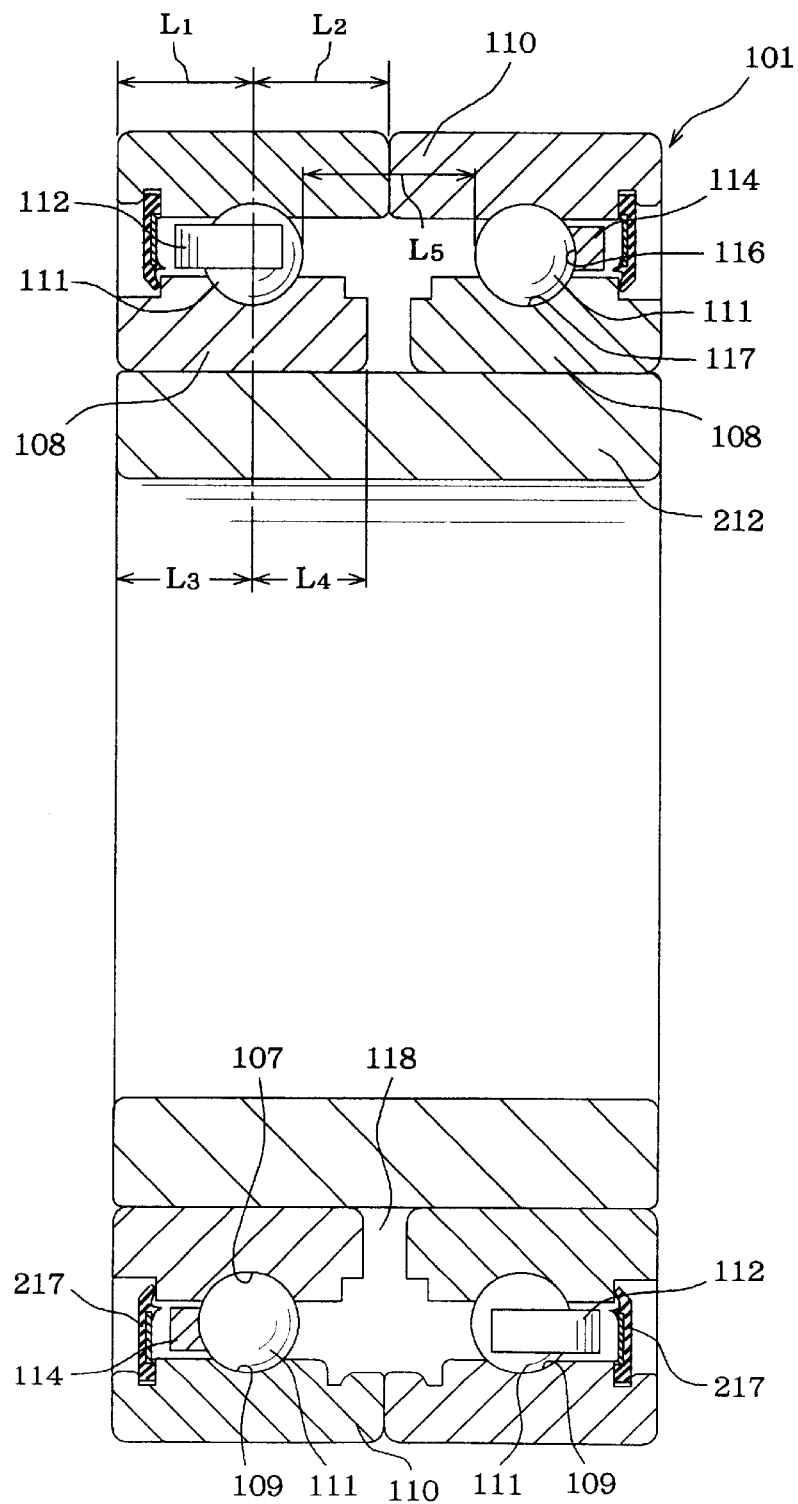
FIG. 22 is a cross sectional view of part of a bearing device according to a sixteenth example of the embodiment of the present invention.

FIG. 22 shows a sixteenth example of the embodiment of the present invention, where the outer rings 110 are located closer to the axial opposite ends of the bearing device 101, and the axial length of the axially outer end of the outer rings 110 and of both axial ends of the sleeve 212 is shorter than the case of the fifteenth example. Therefore, in this embodiment, the length $L_1$ between the axial center of the outer ring raceways 109 and the axially outer end surface of the outer rings 110 is shorter than the axial length $L_2$ between the axial center of the outer ring raceways 109 and the axially inner end surface of the outer rings 110. That is, $L_1<L_2$.

Specifically, the axial center of the outer ring raceways 109 is biased to the side opposite to the abutment of the outer rings 110. And, the outside end surface of the outer rings 110, the outside end surface of the inner rings 108 and the end surfaces of the sleeve are placed substantially at the same location in the axial direction.

Incidentally, the term "substantially at the same location" means that it is not axially displaced more than the sum of the displacement caused by applying the predetermined preload to the balls 111 and the tolerance in dimension required for processing, and that it is 0.25 mm or less in the present example. With 0.25 mm or less, they are deemed to be substantially at the same location.

The whole axial length of the bearing device 101 can be shorter in the present example than in the fifteenth example. Accordingly, the bearing device 101 in the present example can be set in a space smaller than in the fifteenth example.

Incidentally, in the present example, the outer end surface of the inner rings 108 is placed substantially at the same position in the axial direction to the end surface of the sleeve 212. Accordingly, when the sleeve 212 is fitted onto the support shaft 103 for fixing with interference, the outer diameter of the pressing device is made smaller than the inner diameter of the inner rings 108, so that the inner rings 108 and the sleeve 212 are not relatively displaced in the axial direction during pressing, and that the previously set preload is not changed.

The other portions of the structure and operation are the same to those of the fifteenth example.

Figure 23:
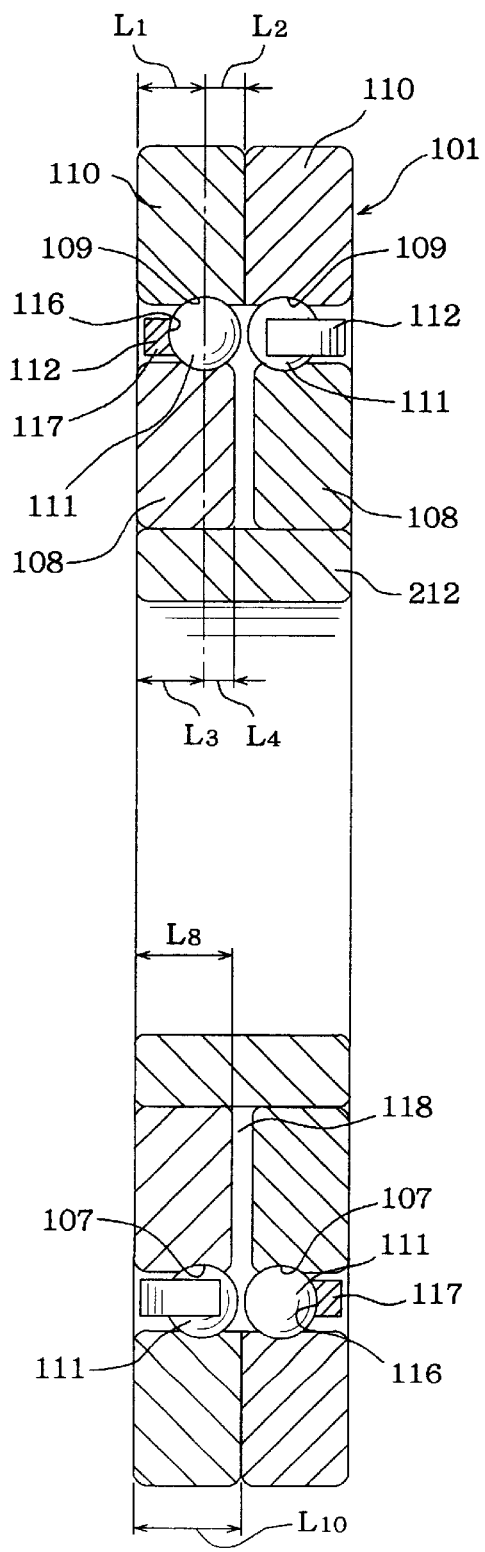
FIG. 23 is a cross sectional view of part of a bearing device according to a seventeenth example of the embodiment of the present invention.
Figure 24:
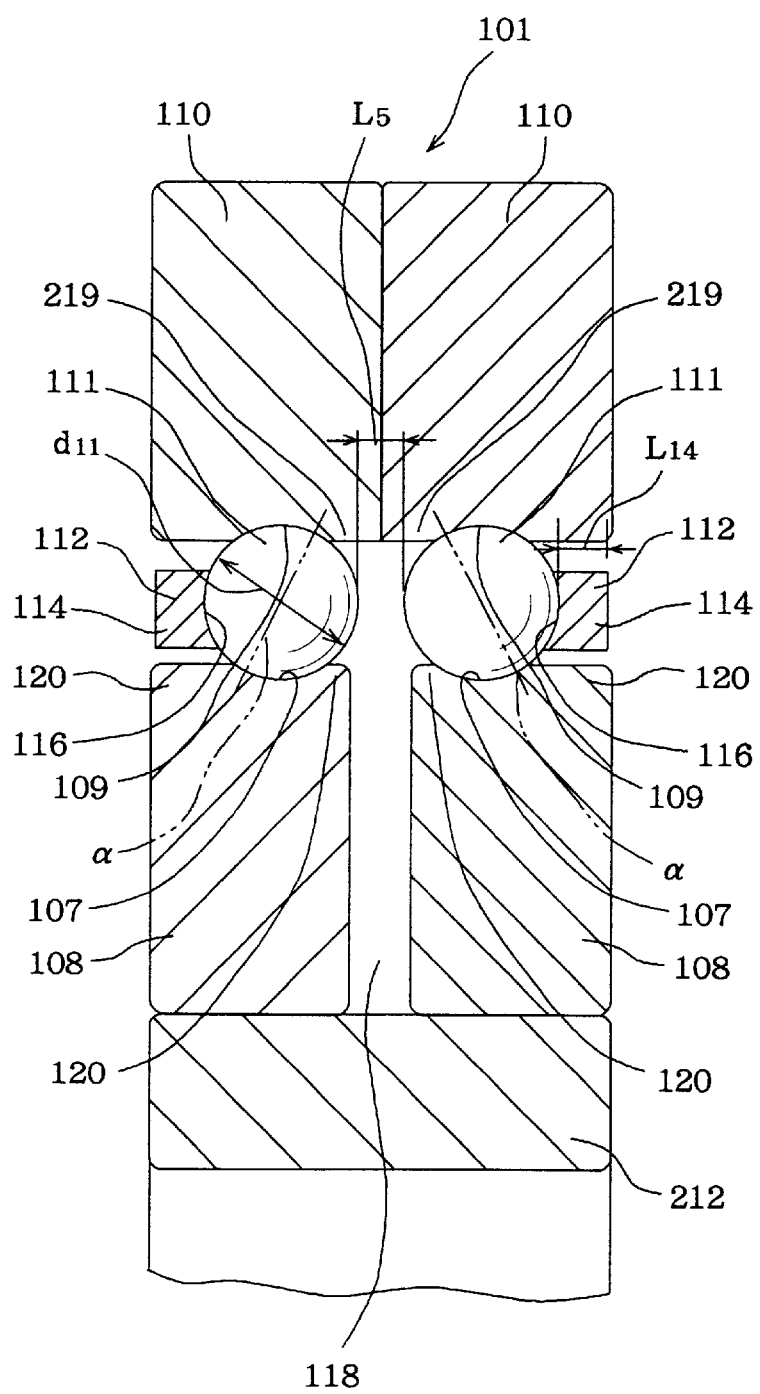
FIG. 24 is a cross sectional view of part of the bearing section according to the seventeenth example of the embodiment of the present invention.

FIGS. 23 and 24 show a seventeenth example of the embodiment of the present invention. In the case of the present invention, the axial center of the Outer ring raceways 109 is biased to the abutment side between the outer rings 110 with respect to the axial direction of the outer rings 110. Accordingly, provided that $L_1$ represents the axial length between the axial center of the outer ring raceways 109 and the axially outer end surface of the outer rings 110, and that $L_2$ represents the axial length between the axial center of the outer ring raceways 109 and the axially inner end surface of the outer rings 110, $L_1$ is larger than $L_2(L_1>L_2)$.

In the present example, different from the previous examples, the seal ring 217 of FIG. 21 is not provided the inner peripheral surface of the outer end of the outer rings 110 and the outer peripheral surface of the outer end of the inner rings 108. In addition, the main portions 117 of the retainers 112 are arranged closer to the both axial ends of the bearing device 101. And, the outer end surface of the outer rings 110, the outer end surface of the inner rings 108, and the end surfaces of the sleeve 212 are placed substantially at the same location in the axial direction as previously mentioned. In the present example, it is 0.25 mm or less. In addition, the end surface of the main portions 117 of the retainers 112 does not project in the axially outer direction than the axially outer end surfaces of the outer and inner rings 110 and 108 with respect to the median of the size tolerance range of the component members. However, the end surface of the main portions 114 may slightly project, depending on the produced condition, than the axially outer end surfaces of the outer and inner rings 110 and 108. In addition, with the present example, part of the balls 111 is axially slightly projected to the side of the gap 116 than the axially inner end surface of the inner rings 108.

The whole axial length of the bearing device 101 in the present example can be further shorter than in the fifteenth example. This is because, in the present example, the axial center of the outer ring raceways 109 is biased to the abutment side between the outer rings 110 with respect to the axial direction of the outer rings 110. Accordingly, the axial length of the shoulder portion 119 on the axially inner side of the inner peripheral surface of the outer rings 110 and of the shoulder portion 120 on the axially inner side of the outer peripheral surface of the inner rings 108 can be made shorter than in the previous examples. In addition, part of the balls 111 kept in the retainers 112 are slightly projected from the inner end surface of the inner rings 108 toward the side where the gap exists. Accordingly, the axial length $L_5$ of the space between the rows of balls 111 in the present invention can be made shorter than in the previous examples.

In the present invention, no seal ring is not provided between the inner peripheral surface of the axially outer end of the outer rings 110 and the outer peripheral surface of the axially outer end of the inner rings 108. Accordingly, the axial length of the axially outer portion than the balls 111 and of the bearing device 101 in the present invention can be made shorter than in the fifteenth example of FIG. 22. Therefore, the bearing device of the present example can be set in the space which is further smaller than in the case of the fifteenth example.

In the present example, the main portions 117 of the retainers 112 are located closer to the both axial ends of the bearing device 101, which also leads to the reduction in the whole length of the bearing device 101. Specifically, the minimum material thickness $L_{14}$ of the main portions 117 in the axial direction must be large in a degree to secure the rigidity of the retainers 112. Accordingly, in the present example where the main portions 117 are arranged closer to the both axial ends of the bearing device 101, comparing with the case where the main portions 117 are arrange at the axial center of the bearing device 101, it is impossible to make smaller the axial length $(L_{14}+d_{11}/2)$ between the axial end surface and the center of the balls 111 which is determined by the minimum material thickness $(L_{14})$ of the main portions 117 and the diameter $(d_{11})$ of the balls 111.

However, the shoulder portions 120a, 120b are different from each other in the required minimum axial length on the both axial ends of the inner rings 108. Specifically, by pushing the inner rings 108 to come closer each other to apply the desired preload to the balls 111, the load is applied to the outer and inner rings 110, 108 from the balls 111 as directed in the direction shown by the dotted lines α in FIG. 20 based on the change in the internal gaps in the component members in the bearing device 101. Therefore, with the pair of shoulder portions 120a, 120b provided on both axial ends of the outer peripheral surface of the inner rings 108, the axially outer shoulder portions 120b, closer to the action point of the load, must have a strength larger than that of the axially inner shoulder portions 120a. The axially outer shoulder portions 120b must be axially longer than the axially inner shoulder portions 120a. Consequently, the axial length of the axially inner shoulder portions 120a can be made sufficiently shorter if the main portions 117 of the retainers 112 do not exist around the axially inner shoulder portions 120a. On the other hand, even if the main portions 117 of the retainers 112 do not exist around the axially outer shoulder portions 120b, the axial length of the axially outer shoulder portions 120b could not be made shorter than the length of the axially inner shoulder portions 120a.

Accordingly, in the present example, the main portions 117 of the retainers 112 are arranged closer to both axial ends of the bearing device 101 around the axially outer shoulder portions 120b of the inner rings 108 to which the load is applied based on the preload. Therefore, in the present embodiment, the axial length of the axially inner shoulder portions 120a of the inner rings 108 to which the load is not applied, can be made sufficiently shorter without being interfered by the existence of the main portions 117. Consequently, the whole axial length of the bearing device can be made smaller than that of the previous examples.

In the present example, the axial length of the axially inner shoulder portions 219 of the outer rings 110 to which the load is applied from the balls 111 based on the preload, is short. However, in the present example, the inner end surfaces of the shoulder portions 219 are abutted to each other, the loads applied from the balls 111 to the shoulder portions 219 are directed to push the shoulder portions 219 to each other and offset. In addition, since there is a gap 118 between the inner end surfaces of the inner rings 108, the axial length of the axially inner shoulder portions 219 of the outer rings 110 is equal to the amount of the sum of the axial length of the axially inner shoulder portions 120a of the inner rings 108 and a half of the gap 116, and sufficiently large. Accordingly, the strength of the shoulder portions 219 is never insufficient.

In the present example, since the whole axial length of the bearing device 101 can be sufficiently small, even if the materials for the hub, the outer rings, the sleeve and the inner rings are largely different in liner expansion coefficient, or even if the outer rings and inner rings are used in the different temperatures, deformation in the fitting fixing portions of these component members due to the difference in the thermal expansion can be kept small. Therefore, the change in the bearing rigidity during use can be kept extremely small.

Incidentally, when implementing this embodiment, the outer ring is not necessarily divided in two pieces. A single piece of outer ring having a double row of outer ring raceways on its inner peripheral surface can be used so long as inconvenience more or less caused in manufacturing and assembling is accepted.

In another feature of the present invention, a bearing device comprises a first and second outer races each having an inner peripheral surface on which an outer ring raceway is formed, a first and second inner races each having an outer peripheral surface on which an inner ring raceway is formed, a plurality of balls rotatably provided between the outer ring raceway and the inner ring raceway, the first and second outer races having an axial end surface, respectively, such that the axial end surfaces are opposed to each other, the first and second inner races having first and second axial end surfaces, respectively, such that the first axial end surfaces are opposed to each other, and the first and second outer races fitted into and fixed to an outer member with the first axial end surfaces abutted to each other, and the first and second inner races fitted into and fixed to an inner member in the state where a desired preload is applied to the balls by pushing the pair of inner races with a gap between the first axial end surfaces thereof to come closer to each other, the inner member having an outer peripheral surface on part of which an outward flange is formed, the outward flange having an axial side surface to which the second axial end surface of the first inner race is abutted for use, wherein the axial length of the inner peripheral surface of the second inner race is larger than the axial length of the inner peripheral surface of the first inner race.

Figure 25:
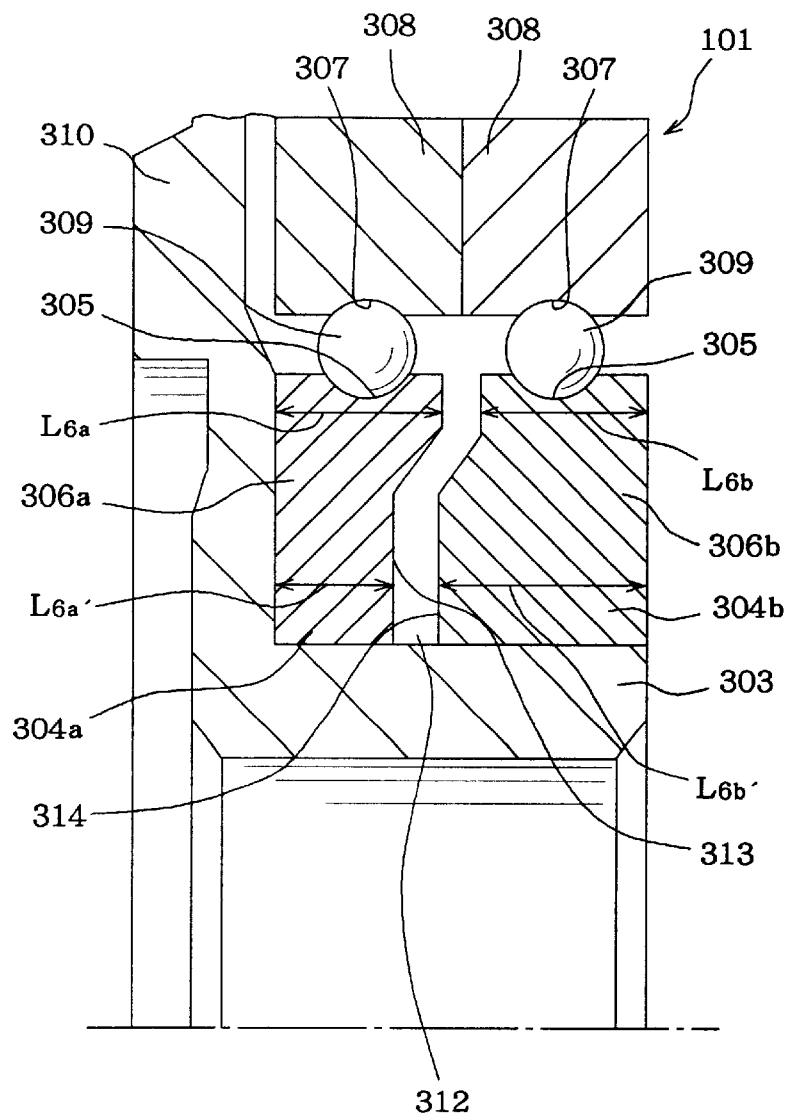
FIG. 25 is a cross sectional view of part of the bearing section according to the eighteenth example of the embodiment of the present invention.

FIG. 25 is an eighteen example of the embodiment of the present invention. The present example is characterized by a structure which is very small in the whole length in the axial direction, wherein the dimensions of the axial length of the inner peripheral surface of first inner ring 306a and second inner ring 306b of the pair of the ball bearings 314a, 314b in order to maintain the desired performance for a long period of time. The other portions of the structure and functions are substantially the same to those of the conventional construction wherein a pair of ball bearings with the same dimension are used and the radially inner ball bearing is supported by the central shaft. The features of the present invention and the portions different from the conventional construction are described hereinafter.

In the case of the bearing device 101 of the present embodiment, the first and second inner rings 306a, 306b of the pair of ball bearings 314a, 314b are fitted onto and fixed with adhesion on the outer peripheral surface of the inner member 303 at two locations separated from the outward flange portion 310. With the pair of inner rings 306a, 306b, one end surface of the inner ring 306a in the axial direction (left end surface in FIG. 25) is abutted to one surface in the axial direction of the outward flange portion 310 (right side face in FIG. 25). And, a gap 312 is provided between the opposing end surfaces in the axial direction of the pair of the inner rings 306a, 306b. The outer rings 308 of the pair of ball bearings 304a, 304b are the same to each other in the axial length. With the axially opposing end surfaces of the outer rings 308 abutted to each other, the outer rings 308 are fitted into and fixed with adhesion to the outer member, specifically the housing (not shown).

Particularly, with the bearing device 101 of the present invention, the axial length $L_{6a}$ of the outer peripheral surface of the inner ring 306a is the same to the axial length $L_{6b}$ of the outer peripheral surface of the inner ring 306b. That is, $L_{6a}=L_{6b}$. In addition, a circular recess portion 313 is provided at the center of the axial end surface (right end surface in FIG. 25) of the inner ring 306a on the side opposing the inner ring 306b. The axial length $L_{6a'}$ of the inner peripheral surface of the inner ring 306a is smaller than the axial length $L_{6a}$ of the outer peripheral surface of the inner ring 306a. That is, $L_{6a'}<L_{6a}$.

On the other hand, with the inner ring 306b, a circular land portion 314 is provided at the center of the axial end surface (left end surface in FIG. 25) of the inner ring 306b on the side opposing the inner ring 306a. The axial length $L_{6b'}$ of the inner peripheral surface of the inner ring 306b is larger than the axial length $L_{6b}$ of the outer peripheral surface of the inner ring 306b. That is, $L_{6b'}>L_{6b}$. Consequently, The axial length $L_{6b'}$ of the inner peripheral surface of the inner ring 306b is larger than the axial length $L_{6a'}$ of the inner peripheral surface of the inner ring 306a. That is, $L_{6a'}<L_{6b'}$. In addition, part of the land portion 314 on the one end surface in the axial direction of the inner ring 306b is located within the recess portion 317 on the axially opposite end surface of the inner ring 306a.

When the inner rings 306a, 306b are fixed with adhesion to the outer peripheral surface of the inner member 303, the factors to strongly affect the adhesion force (bonding strength) to bond the respective inner rings 306a, 306b to the inner member 303 are as follows;

1. kinds of the adhesive,
2. any oil exists or not on the surface on which the adhesive is coated,
3. the thickness of the adhesion gap and the existence or not of the adhesive reservoir,
4. the area of the portion to be bonded with the adhesive (adhesion portion).

Accordingly, to make the bonding strength larger, the optimum one must be selected from the factors 1 to 4 above.

When the present invention is implemented, adhesives of the ultraviolet curable type, not being anaerobic, and epoxy resin of the heat curable type and one-part type are desirably used. Or, acrylic resin adhesive of the anaerobic and heat plastic type (Trade name: Rocktite etc.) can also used.

In the construction according to the present invention, with the film of the adhesive existing between the inner peripheral surface of the respective inner rings 306a, 306b and the outer peripheral surface of the inner member 303, at least one end surface in the axial direction is not covered by metal etc. but exposed to the ambient air. Accordingly, the anaerobic acrylic resin adhesive, when used in this condition, is hard to be solidified. Accordingly, when the present invention is implemented, it is desirable to use the ultraviolet curable type or the epoxy resin adhesive which is not anaerobic.

As to the item 2 above, it is desirable for larger bonding strength to sufficiently remove oil from the surface to be coated with the adhesive. Accordingly, when implementing the present invention, organic solvent such as alcohol or xylene is used to wipe the oil from the inner peripheral surface of the first inner ring 306a and second inner ring 306b and from the portion of the inner member 303 on which the respective inner rings 306a, 306b are fitted.

With the item 3, when implementing the present invention, the adhesion gap between the inner peripheral surface of the respective inner rings 306a, 306b and the outer peripheral surface of the inner member 303 has a thickness desirably controlled to be more than zero and up to 15 $\mu$m, and more desirably controlled to be more than zero and up to 12 $\mu$m. Specifically, as the thickness of the adhesion gap is larger, the thickness of the film of the adhesive within the adhesion gap is larger. Accordingly, it is desirable to make the adhesion gap as large as possible so as to improve the bonding strength of the adhesive. However, when the thickness of the adhesion gap is larger than 12 $\mu$m (even the largest, 15 $\mu$m), there could be some problems, for example the first inner ring 306a and second inner ring 306b could be eccentric with respect to the inner member 303. Therefore, the upper limit of the adhesion gap is set to be desirable 15 $\mu$m, and more desirably 12 $\mu$m.

In the case of the present invention, it is desirable that any knurling groove such as in a tilted lattice shape or spline type can be formed on the outer peripheral surface of the inner member 303, or that any recess groove is formed to have a width smaller than the axial length of the respective inner rings 306a, 306b. Within the knurling groove or recess groove, part of the adhesive enters in it to increase the amount of the adhesive, so that the bonding strength can be increased without having the respective inner rings 306a, 306b eccentric with respect to the inner member 303.

With the bearing device of the present invention constructed as mentioned above, the axial length $L_{6a'}$ of the inner peripheral surface of the first inner ring 306a on the same side as the outward flange portion 310 is smaller, and by that amount, the axial length $L_{6b'}$ of the inner peripheral surface of the second inner ring 306b on the side opposite to the outward flange portion 310 can be larger. Accordingly, when the whole axial length of the bearing device 101 is very small while the second inner ring 306b is fixed to the inner member with adhesion, the bonding strength between the second inner ring 306b and the inner member 303 can be sufficiently secured for a long time of period. Specifically, although the bonding strength is strongly affected by the factors 1 to 4 as mentioned above, if the effects of the factors 1 to 3 are the same, as the area of bonding portion in the factor 4 is larger, the bonding strength is larger. With the present invention, the axial length $L_{6b'}$ of the inner peripheral surface of the second inner ring 306b is made larger, and by that amount, the bonding area between the inner peripheral surface of the second inner ring 306b and the outer peripheral surface of the inner member 303 can be sufficiently larger to sufficiently secure bonding strength.

With the present embodiment, the axial length $L_{6a'}$ of the inner peripheral surface of the first inner ring 306a is small, but the axial end surface of the first inner ring 306a is abutted to the one end surface in the axial direction of the outward flange portion 310, and a load based on the preload is applied to push the first inner ring 306a to the outward flange portion 310. Accordingly, even if the bonding strength between the first inner ring 306a and the inner member 303 is insufficient to support the axial load corresponding to the preload, the first inner ring 306a would not be displaced with respect to the inner member 303. Consequently, in the structure where the whole axial length is very short, the inner rings 306a, 306b are prevented from being displaced with respect to the inner member 303, so that the desired performance can be kept for a long period of time.

Figure 26:
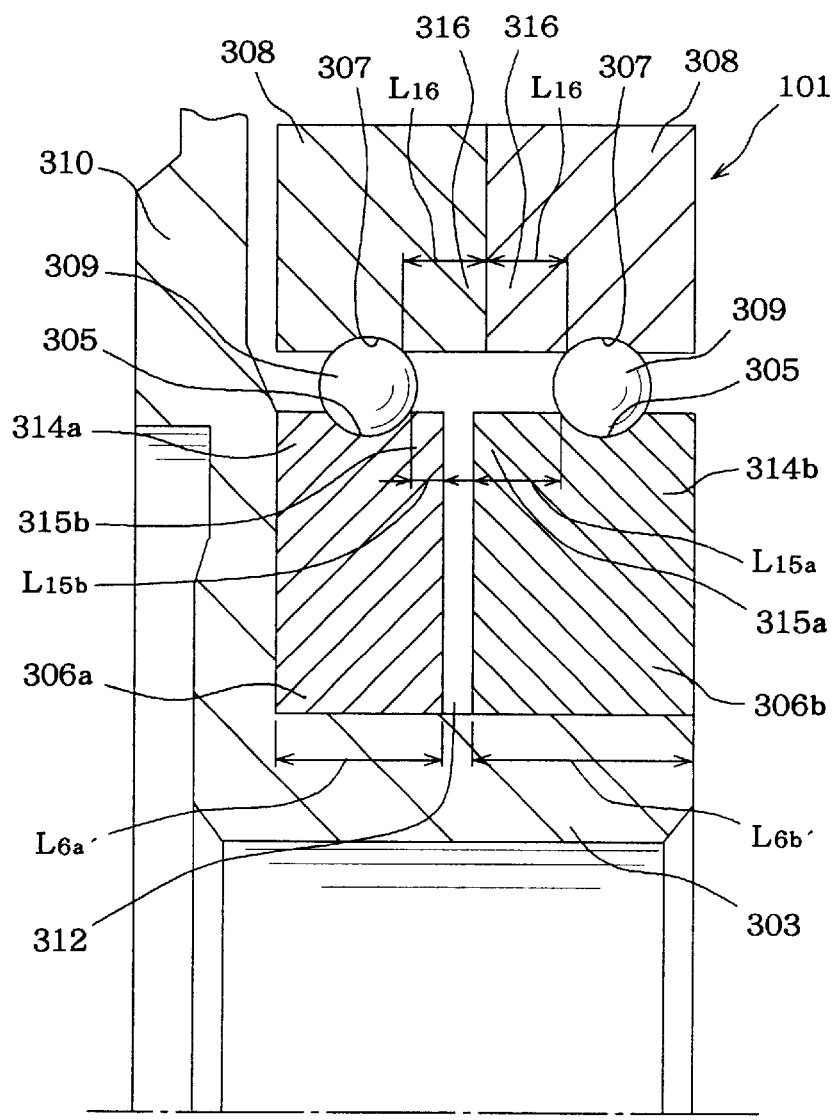
FIG. 26 is a cross sectional view of part of the bearing section according to the nineteenth example of the embodiment of the present invention.

FIG. 26 shows a nineteenth example of the embodiment of the present invention. This is different from the eighteenth example in that with the axial opposite end surfaces of the respective inner rings 306a, 306b, the opposing axial end surfaces are a simple flat surface, without having the recess portion 313 and the land portion 314 (FIG. 25). Particularly, the shoulder portions 315a, 315b are provided on the side facing the pair of inner rings 306a, 306b, such that the axial length $L_{15a}$ is different from the axial length $L_{15b}$.

With the pair of the inner rings 306a, 306b, the axial length $L_{15a}$ of the shoulder portion 315a of the second inner ring 306b (right one in FIG. 26) on one side in the axial direction (left side in FIG. 26) is larger than the axial length $L_{16}$ of the shoulder portion 316 of the outer ring 308 on one side in the axial direction (left side in FIG. 26) around the second inner ring 306b. That is, $L_{15a} > L_{16}$.

On the other hand, the axial length $L_{15b}$ of the shoulder portion 315b of the first inner ring 306a on one side in the axial direction (right side in FIG. 26) is sufficiently smaller than the axial length $L_{16}$ of the shoulder portion 316 of the outer ring 308 on one side in the axial direction (right side in FIG. 26) provided around the first inner ring 306a. That is, $L_{15b} < L_{16}$.

And, the whole axial length of the second inner ring 306b is larger than the whole axial length of the first inner ring 306a. Accordingly, as in the eighteenth example, the axial length $L_{6b'}$ of the inner peripheral surface of the second inner ring 306b is larger than the axial length $L_{6a'}$ of the inner peripheral surface of the first inner ring 306a.

The other portions of the structure and function are substantially the same to those of the eighteenth example.

Figure 27:
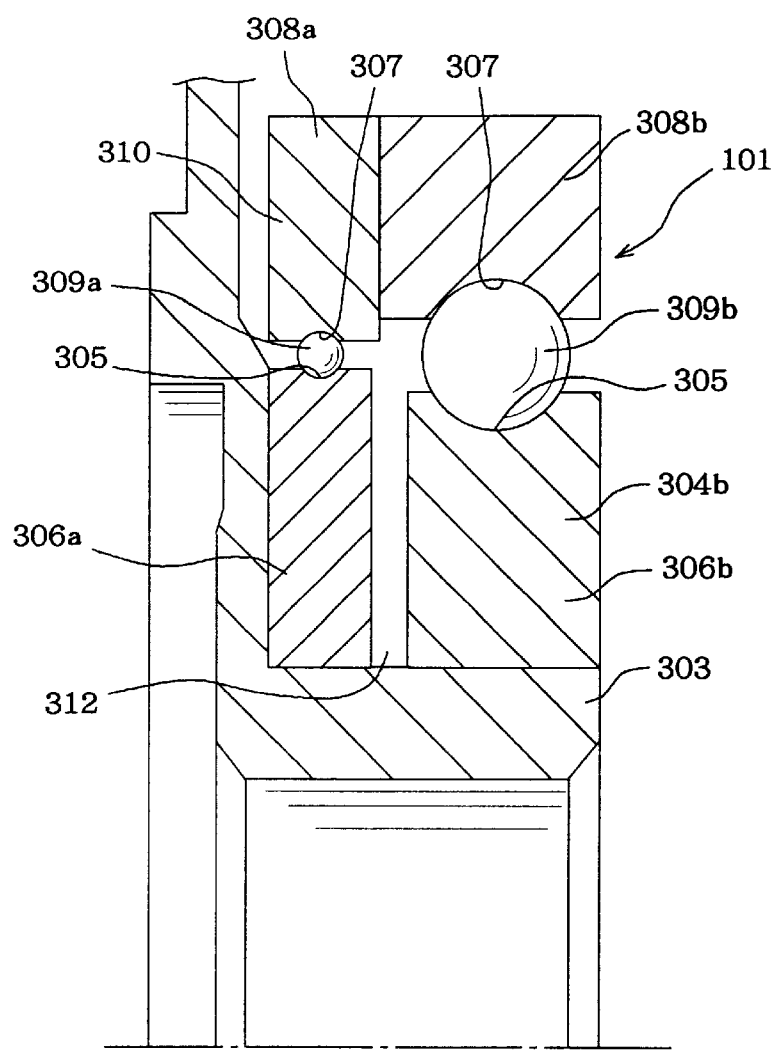
FIG. 27 is a cross sectional view of part of the bearing section according to the twentieth example of the embodiment of the present invention.

FIG. 27 shows a twentieth example of the embodiment of the present invention, wherein the pair of first and second ball bearings 304a, 304b are different from each other, specifically in the outer diameter of the respective inner rings 306a, 306b and in the inner diameter of the respective outer rings 308a, 308b. Specifically, the outer diameter of the inner ring 306a of the first ball bearing 304a (left one in FIG. 27) is larger than the outer diameter of the inner ring 306b of the second ball bearing 304b (right one in FIG. 27). In addition, the inner diameter of the outer ring 308a of the first ball bearing 304a is smaller than the inner diameter of the outer ring 308b of the second ball bearing 304b.

In addition, the axial length of the outer ring 308b of the second ball bearing 304b is larger than the axial length of the outer ring 308a of the first ball bearing 304a. And, the axial length of the inner ring 306b of the second ball bearing 304b is larger than the axial length of the inner ring 306a of the first ball bearing 304a. Further, with respect to the balls 309a, 309b of the ball bearings 304a, 304b the outer diameter of in the first ball bearing 304a is smaller than that in the second ball bearing 304b.

The other portions in the structure and function are substantially the same to those in the nineteenth example in FIG. 26.

The examples mentioned above are directed to the structure where the first inner ring 306a is abutted to the outward flange 310, and fitted onto and fixed through bonding to the inner member 303.

However, the present invention is not limited to the structure, and can be applied to the structure where the first inner ring 306a is fitted onto and fixed to the inner member 303 with a predetermined interference.

What is claims is:

1. A bearing device comprising a shaft, a housing, a double row of bearings provided between the shaft and the housing and having first and second races, third and fourth races facing the first and second races, respectively, and balls between the first and third races and between the second and fourth races, the third and fourth races being integral with each other and first and second races being separated from each other with a gap therebetween for preload adjustment, the first race being fitted to one of the shaft and the housing, the second race being fixed to the one of the shaft and housing, the third and fourth races being fixed to the other of the shaft and the housing, the preload being applied to the bearings by pressing the first race toward the second race to make the gap narrower, and the bearing device further having a support member for supporting a side of the first race remote from the gap in the pre-loading direction, and the support member provided on a side of one of the shaft and the housing, the first race having a side surface and the second race having a side surface facing the side surface of the first race with the gap therebetween, such that part of the side surface of the first race remote from the balls is recessed or removed while part of the side surface of the second race remote from the balls is projected toward the part which is recessed or removed from the side surface of the first race.

2. A bearing device comprising a shaft, a housing, a double row of bearings provided between the shaft and the housing and having first and second races, third and fourth races facing the first and second races, respectively, and balls between the first and third races and between the second and fourth races, the third and fourth races being integral with each other and the first and second races being separated from each other with a gap therebetween for preload adjustment, the first race being fitted to the shaft, the second race being fixed to the shaft, the third and fourth races being fixed to the housing, the preload being applied to the bearings by pressing the first race toward the second race to make the gap narrower, and the bearing device further having a support member for supporting a side of the first race remote from the gap in the pre-loading direction, the support member provided on a side of the shaft to contact the side of the first race remote from the gap, and the first and second races each having a radially inner section closer to the shaft and a radially outer section remote from the shaft, and the radially inner section and the radially outer section each having a width, and the radially inner section of the first race is narrower than the radially outer section of the first race and the radially inner section of the second race is broader than the radially outer section of the second race, such that the width of the radially inner section of the first race is smaller than the width of the radially inner section of the second race.

3. A bearing device comprising a shaft, a housing, a double row of bearings provided between the shaft and the housing and having first and second races, third and fourth races facing the first and second races, respectively, and balls between the first and third races and between the second and fourth races, the third and fourth races being integral with each other and the first and second races being separated from each other with a gap therebetween for preload adjustment, the first race being fitted to the housing, the second race being fixed to the housing, the third and fourth races being fixed to the shaft, the preload being applied to the bearings by pressing the first race toward the second race to make the gap narrower, and the bearing device further having a support member for supporting a side of the first race remote from the gap in the pre-loading direction, the support member provided on a side of the housing to contact the side of the first race remote from the gap, and the first and second races having a radially outer section closer to the housing and a radially inner section remote from the housing, and the radially inner section and the radially outer section each having a width, and the radially outer section of the first race is narrower than the radially inner section of the first race and the radially outer section of the second race is broader than the radially inner section of the second race, such that the width of the radially outer section of the first race is smaller than the width of the radially outer section of the second race.

* * * * *